United States Patent (10) Patent No.: US 11,803,189 B2
Yuguchi (45) Date of Patent: Oct. 31, 2023

(54) CONTROL APPARATUS, CONTROL METHOD, ROBOT APPARATUS AND PROGRAM

(71) Applicant: SONY CORPORATION, Tokyo (JP)

(72) Inventor: Yudai Yuguchi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 188 days.

(21) Appl. No.: 17/049,791

(22) PCT Filed: Jan. 18, 2019

(86) PCT No.: PCT/JP2019/001525
§ 371 (c)(1),
(2) Date: Oct. 22, 2020

(87) PCT Pub. No.: WO2019/230037
PCT Pub. Date: Dec. 5, 2019

(65) Prior Publication Data
US 2021/0240194 A1 Aug. 5, 2021

(30) Foreign Application Priority Data
May 30, 2018 (JP) .................. 2018-103203

(51) Int. Cl.
G05D 1/02 (2020.01)

(52) U.S. Cl.
CPC .................. G05D 1/0238 (2013.01)

(58) Field of Classification Search
CPC ........ G05D 1/0238; G05B 2219/39094; G05B 2219/40548; G05B 2219/40577; G05B 2219/40611; G05B 19/406; G05B 19/4061; G05B 2219/39083; G05B 2219/39096; B25J 9/1694; B25J 9/1664–1666; B25J 9/1674–1676; G06V 10/20; G06V 10/22; G06V 10/245; G06V 10/25; G06V 10/255; G06V 10/273; G06V 10/72; G06V 10/74; G06V 20/58
See application file for complete search history.

(56) References Cited

U.S. PATENT DOCUMENTS

2009/0208094 A1* 8/2009 Hattori ................... B25J 9/1697
                                                                                  382/153
2013/0266205 A1* 10/2013 Valpola ................... B25J 9/1697
                                                                                  382/153
2014/0025203 A1 1/2014 Inazumi
2014/0031981 A1 1/2014 Fernando et al.

FOREIGN PATENT DOCUMENTS

| EP | 2366503 A2 | 9/2011 |
| JP | 2005109647 A | 4/2005 |
| JP | 2008006519 A | 1/2008 |
| JP | 2009-255264 A | 11/2009 |
| JP | 2012130986 A | 7/2012 |

* cited by examiner

Primary Examiner — Bao Long T Nguyen
(74) Attorney, Agent, or Firm — Paratus Law Group, PLLC

(57) ABSTRACT

Provided is a control apparatus including: an assessment unit configured to assess whether a relevant element is represented by environment information acquired from a sensor or not; and an environment information setting unit configured to, in a case where the assessment unit has assessed that the relevant element is represented by the environment information, switch the environment information to acquired-in-advance environment information in which the relevant element is not included.

26 Claims, 10 Drawing Sheets

[Fig. 1]
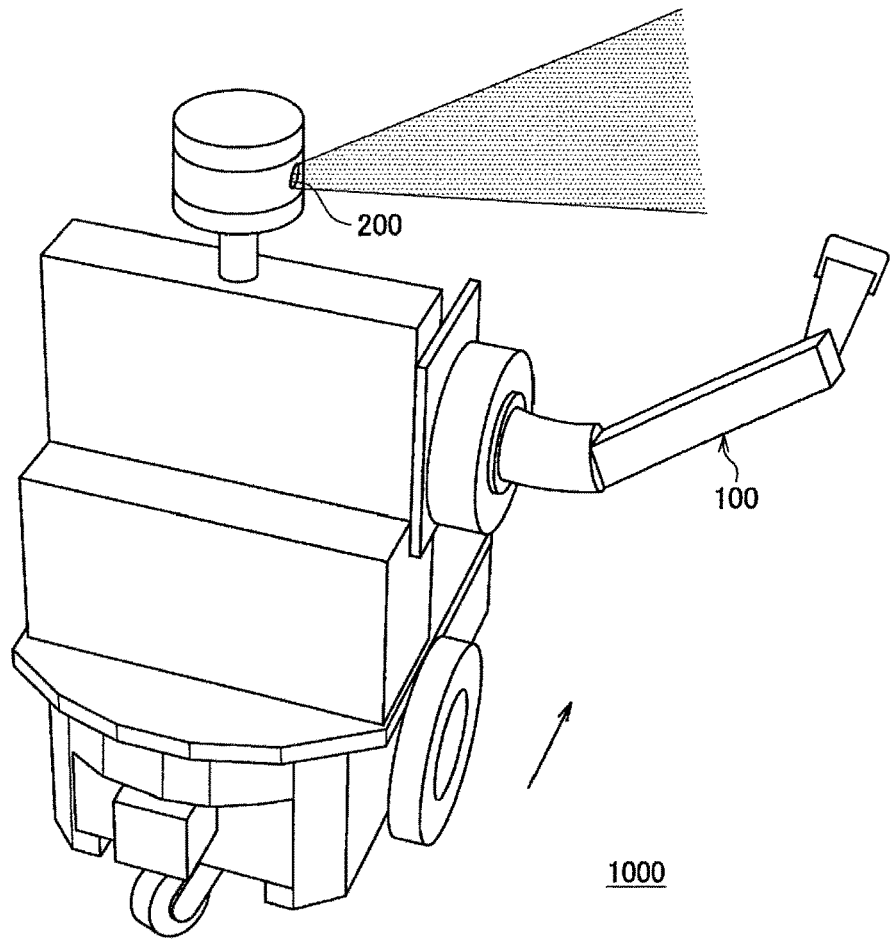
[Fig. 2]
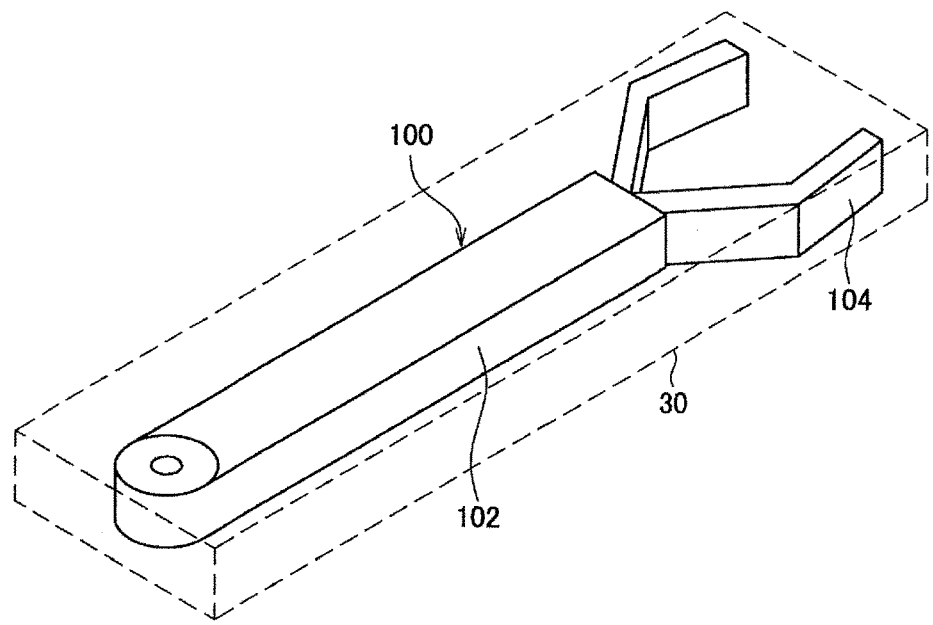

[Fig. 3]
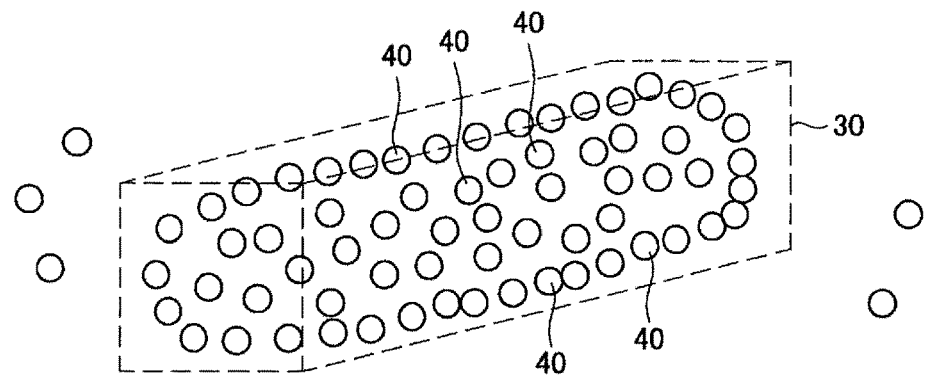
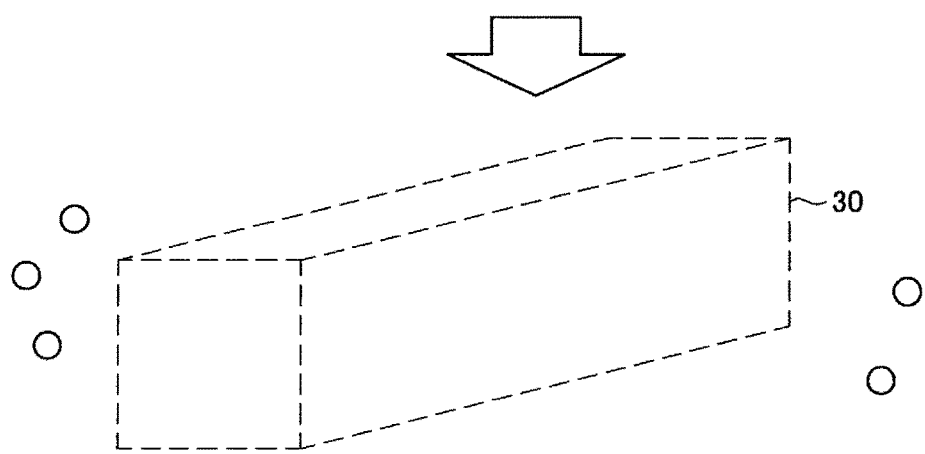
[Fig. 4A]
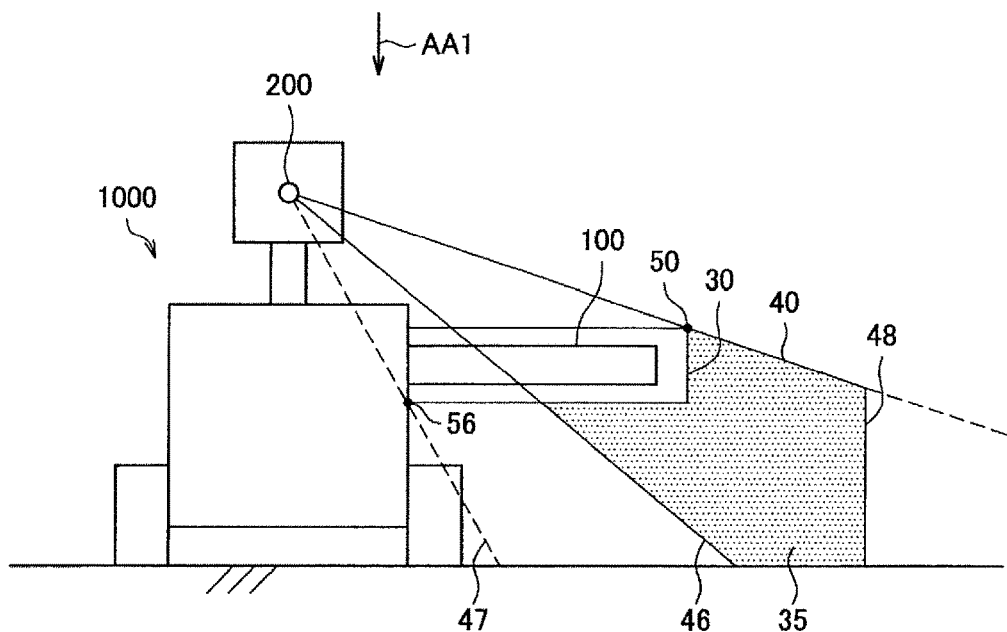

[Fig. 4B]
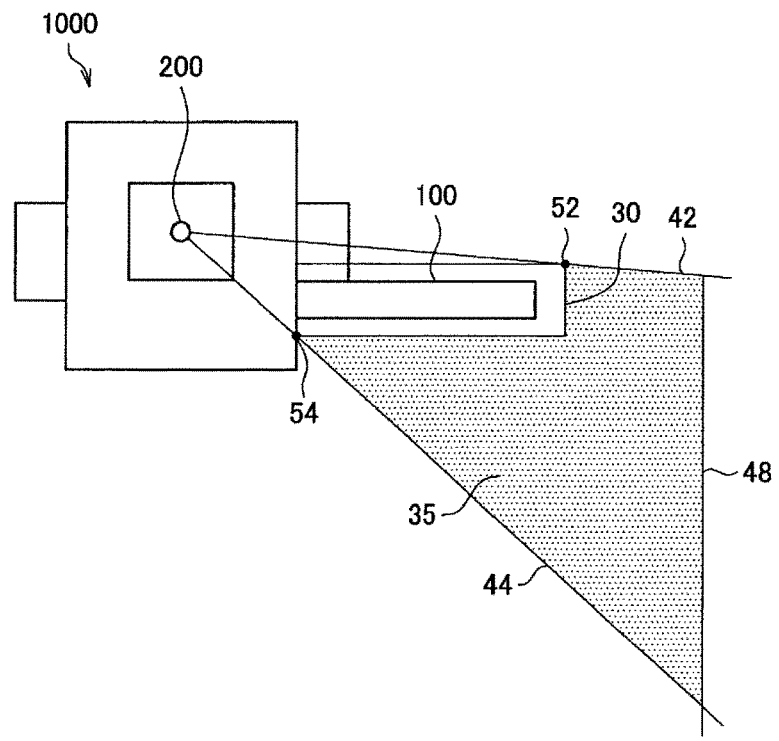
[Fig. 5A]
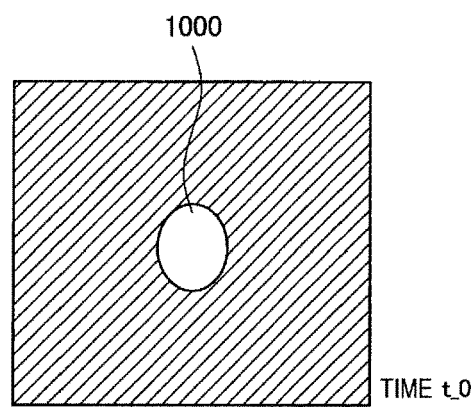
[Fig. 5B]
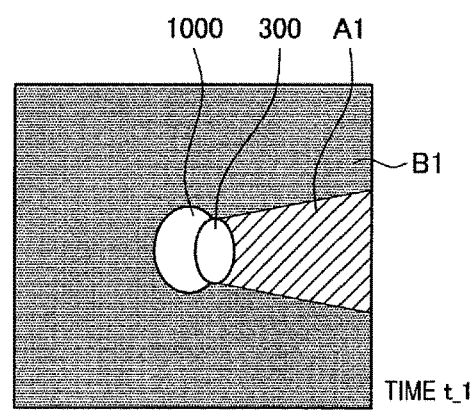

[Fig. 5C]
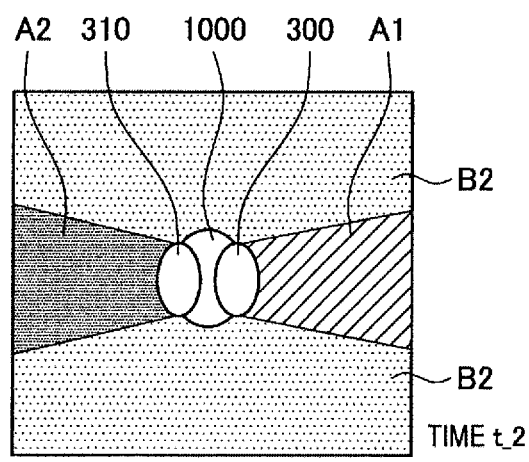

[Fig. 6]
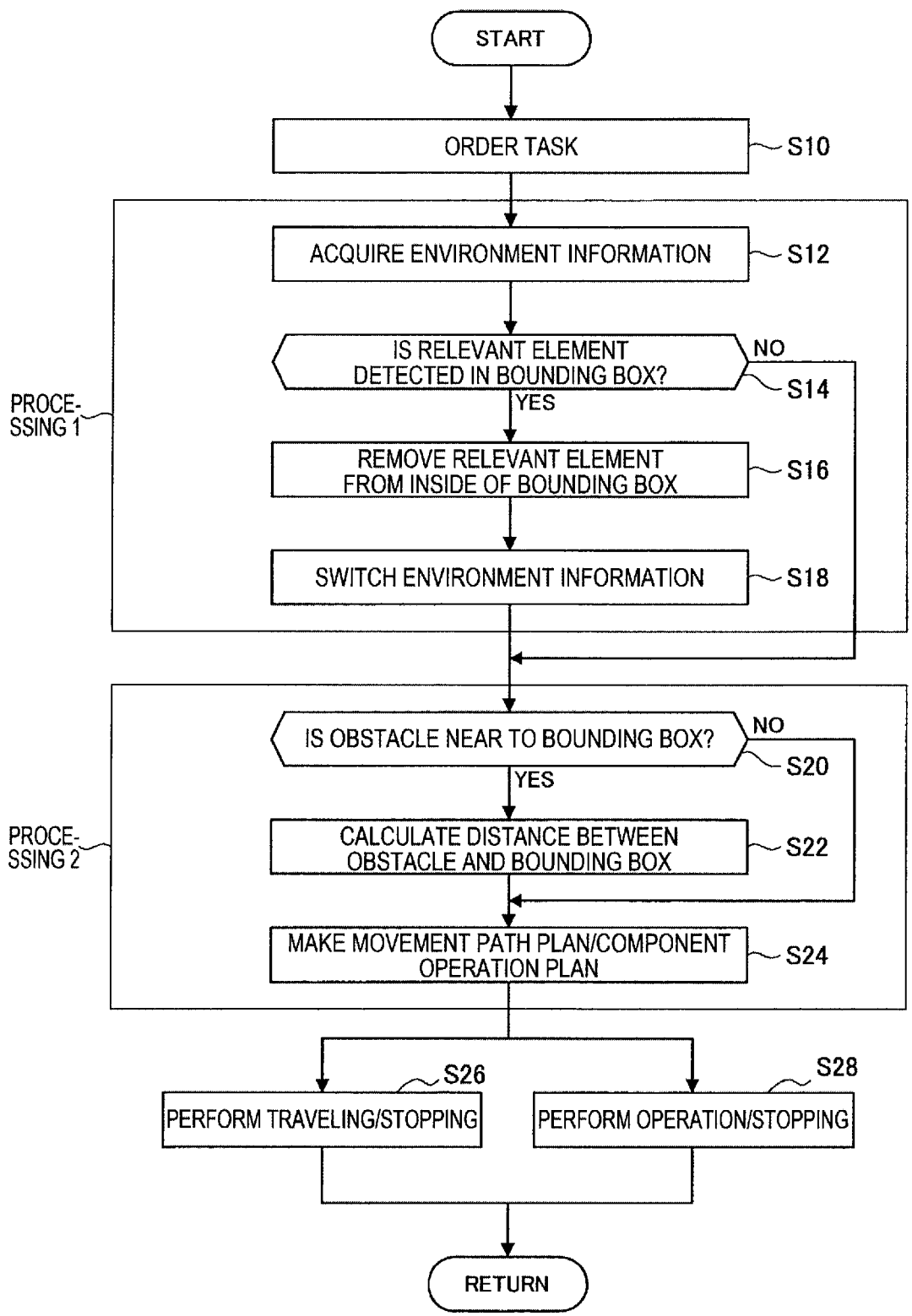

[Fig. 7]
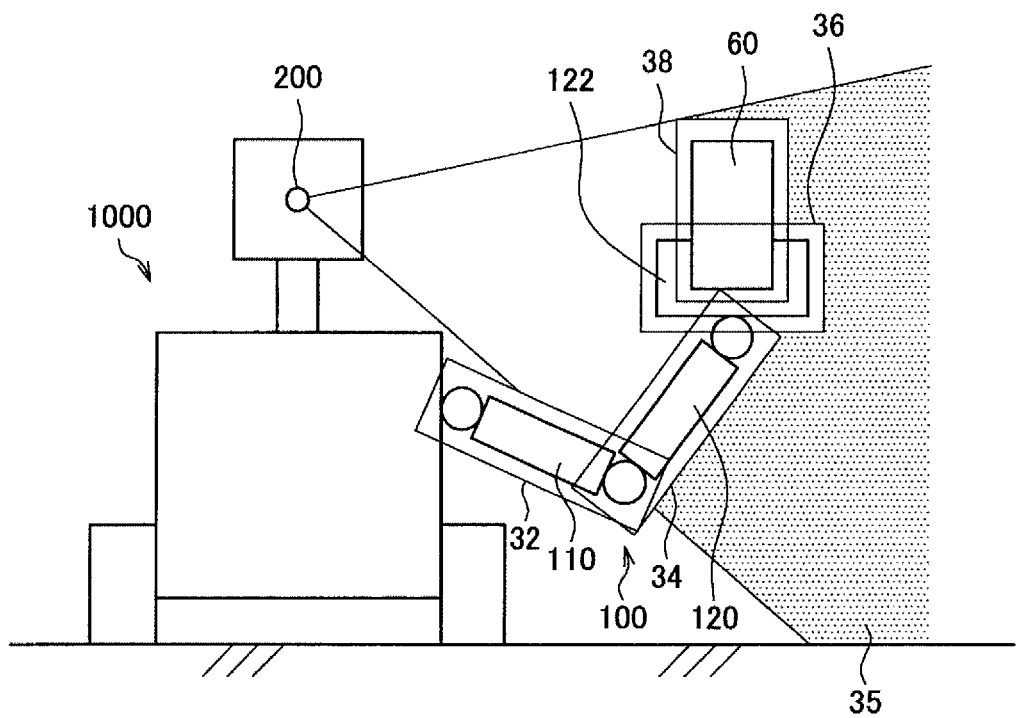
[Fig. 8]
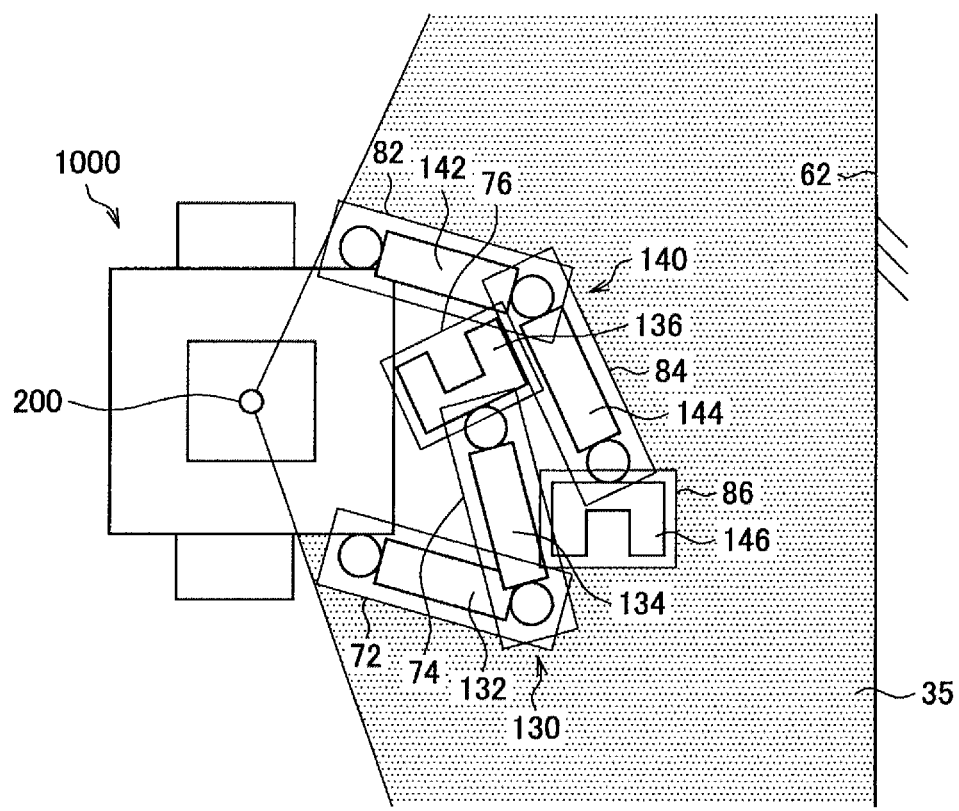

[Fig. 9A]
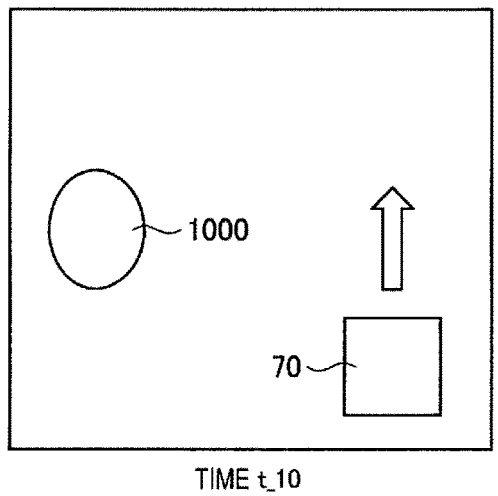
TIME t_10
[Fig. 9B]
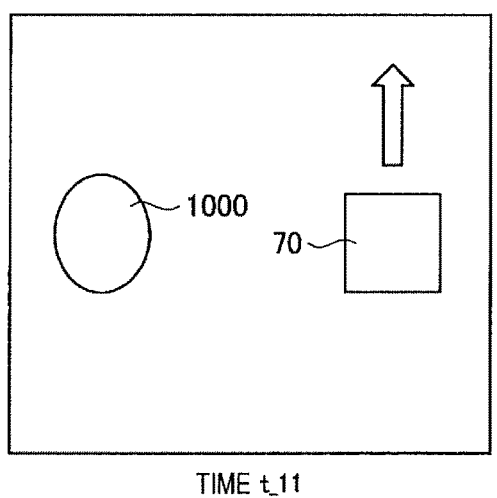
TIME t_11
[Fig. 9C]
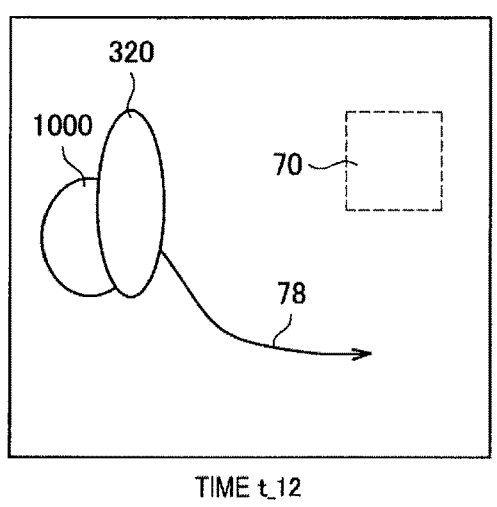
TIME t_12

[Fig. 9D]
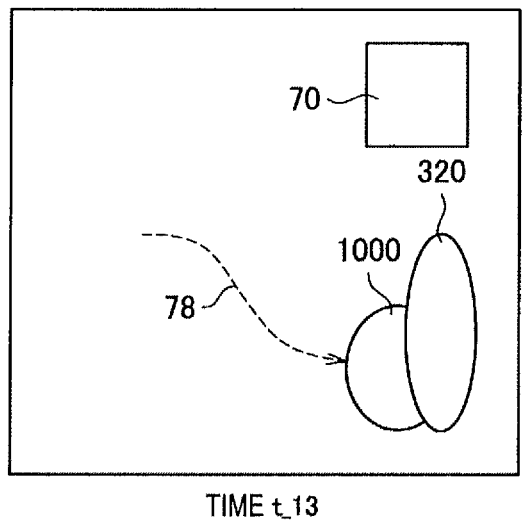
TIME t_13
[Fig. 10]
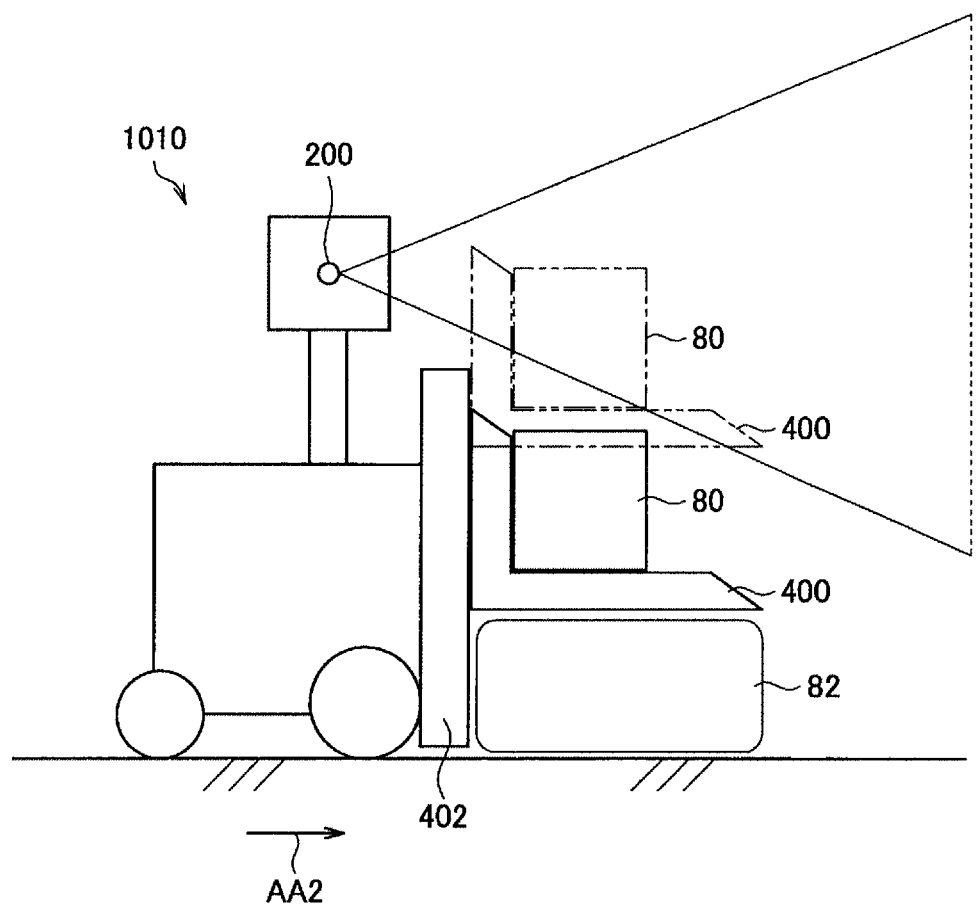

[Fig. 11]
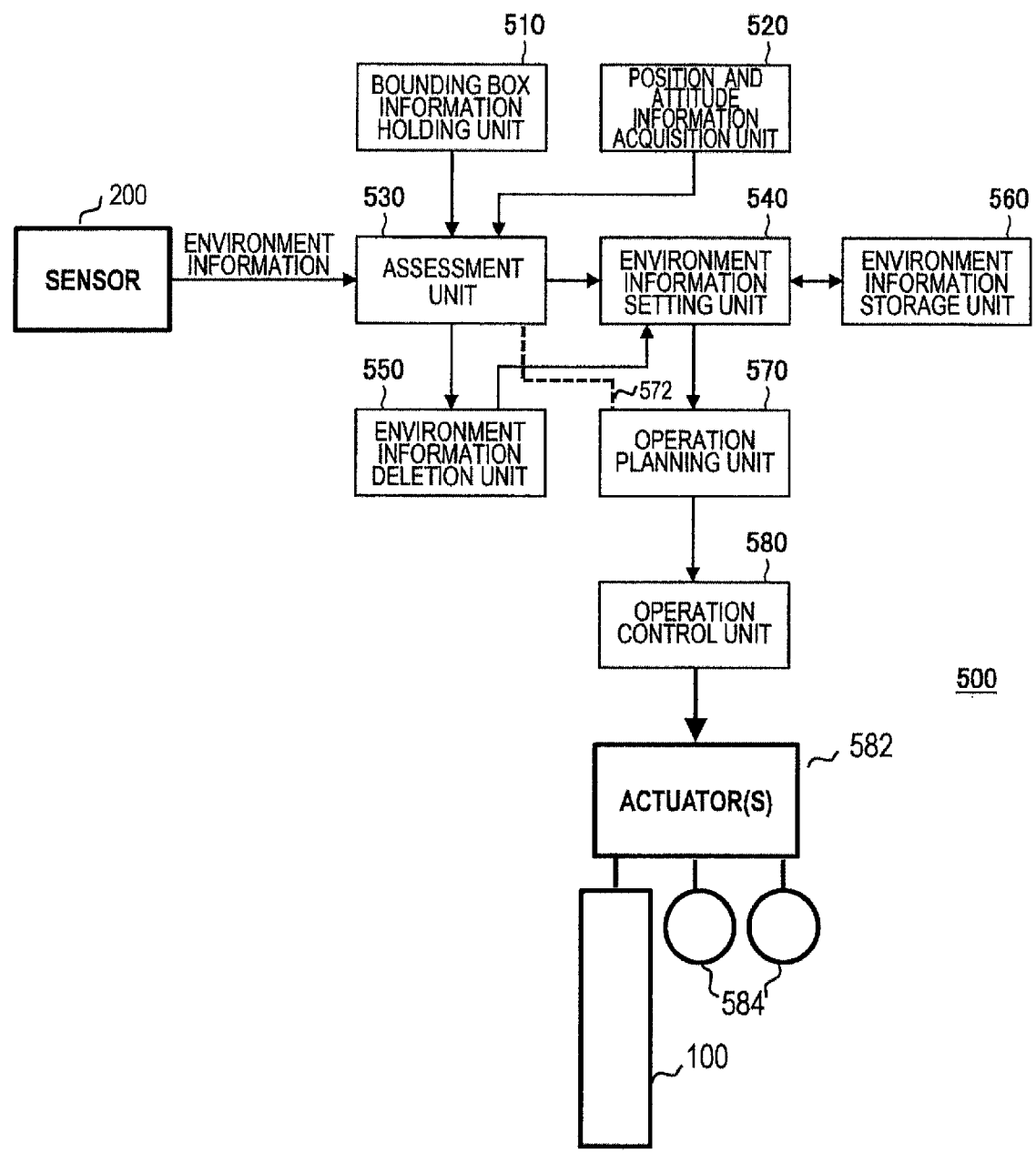

[Fig. 12]
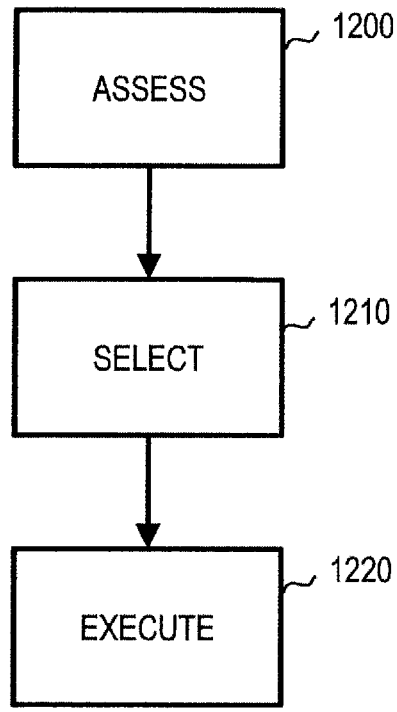
[Fig. 13]
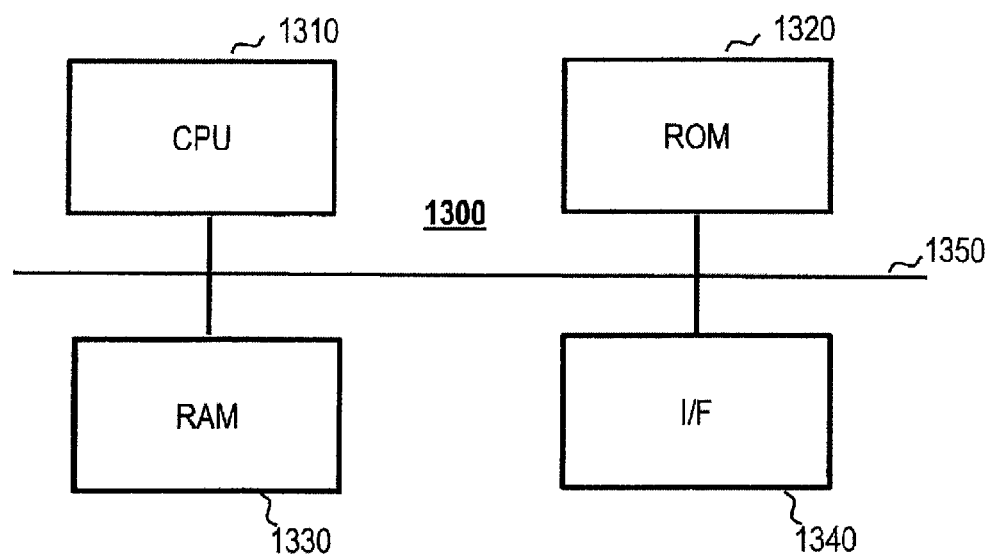

CONTROL APPARATUS, CONTROL METHOD, ROBOT APPARATUS AND PROGRAM

CROSS REFERENCE TO RELATED APPLICATIONS

This application is a National Stage Patent Application of PCT International Patent Application No. PCT/JP2019/001525 filed Jan. 18, 2019 under 35 U.S.C. § 371, which claims the benefit of Japanese Priority Patent Application JP 2018-103203 filed May 30, 2018, the entire contents of which are incorporated herein by reference.

TECHNICAL FIELD

The present disclosure relates to a control apparatus, a control method, and a program.

BACKGROUND ART

Thus far, PTL 1 below has stated that a detection signal outputted by a sensor unit observing an operation unit of a robot (part of the robot) is negated.

CITATION LIST

Patent Literature

[PTL 1]
JP 2009-255264A

SUMMARY

Technical Problem

However, in the technology described in PTL 1 above, since a detection signal corresponding to the operation unit of the robot is negated, there is a problem that the situation of the region where the operation unit exists and the surroundings cannot be grasped. Hence, the situation of the surroundings of the robot is unclear, and it is difficult to make an operation plan of the robot on the basis of the positions etc. of obstacles around the robot. In the technology described in PTL 1 above, since a detection signal corresponding to the operation unit of the robot is negated, the situation of the surroundings of the robot cannot be grasped after the negation, and safe running of the robot is hindered.

Thus, it has been necessary to enable optimum operation even in a case where an element relevant to a robot is included in or represented by environment information.

Solution to Problem

The present disclosure is defined by the appended claims.

According to an embodiment of the present disclosure, there is provided a control apparatus including: an assessment unit configured to assess whether a relevant element (such as a robot arm, though other examples are given below) is included in or represented by environment information acquired from a sensor or not; and an environment information setting unit configured to, in a case where the assessment unit has assessed that the relevant element is included switch the environment information to acquired-in-advance environment information in which the relevant element is not included.

In addition, according to an embodiment of the present disclosure, there is provided a control method including: assessing whether a relevant element is included in or represented by environment information acquired from a sensor or not; and in a case where it is assessed that the relevant element is included in or represented by the environment information, switching the environment information to acquired-in-advance environment information in which the relevant element is not included.

In addition, according to an embodiment of the present disclosure, there is provided a program for causing a computer to function as: a device configured to assess whether a relevant element is included in or represented by environment information acquired from a sensor or not; and a device configured to, in a case where it is assessed that the relevant element is included in or represented by the environment information, switch the environment information to acquired-in-advance environment information in which the relevant element is not included.

Advantageous Effects of Invention

As described above, according to an embodiment of the present disclosure, operation can be enabled even in a case where a relevant element is included in environment information.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 1 is a schematic diagram showing a state where a robot apparatus according to an embodiment of the present disclosure is moving in an arrow direction.

FIG. 2 is a schematic diagram showing an example of a bounding box.

FIG. 3 is a schematic diagram showing processing in a case where a relevant element is included in a bounding box.

FIG. 4A is a schematic diagram showing a switching range in which environment information is switched.

FIG. 4B is a schematic diagram showing a switching range in which environment information is switched.

FIG. 5A is a schematic diagram showing a use example of environment information acquired at present and in advance, on a time-series basis.

FIG. 5B is a schematic diagram showing a use example of environment information acquired at present and in advance, on a time-series basis.

FIG. 5C is a schematic diagram showing a use example of environment information acquired at present and in advance, on a time-series basis.

FIG. 6 is a flow chart showing a flow of processing in a robot apparatus.

FIG. 7 is a schematic diagram showing an example in which bounding boxes are obtained, including a grip object.

FIG. 8 is a schematic diagram showing an example in which two arms exist to overlap between a robot apparatus and a wall.

FIG. 9A is a schematic diagram showing an example of processing of predicting a movement locus for a mobile obstacle.

FIG. 9B is a schematic diagram showing an example of processing of predicting a movement locus for a mobile obstacle.

FIG. 9C is a schematic diagram showing an example of processing of predicting a movement locus for a mobile obstacle.

FIG. 9D is a schematic diagram showing an example of processing of predicting a movement locus for a mobile obstacle.

FIG. 10 is a schematic diagram showing an example of unloading by a forklift.

FIG. 11 is a block diagram showing a configuration of a control apparatus that controls a robot apparatus.

FIG. 12 is a schematic flowchart illustrating a method.

FIG. 13 is a schematic diagram illustrating a data processing apparatus.

DESCRIPTION OF EMBODIMENTS

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description is given in the following order.
1. Significance of external world information in autonomic movement technology
2. Overview of robot apparatus
3. Information replacement of region obstructed by relevant element
   3.1. With regard to bounding box
   3.2. Specific example of bounding box
   3.3. Deletion of environment information in bounding box
   3.4. Switching of environment information
   3.5. Time-series flow of information switching
4. Flow of processing in robot apparatus
5. Case where relevant elements include grip object
6. Example in case where relevant elements overlap
7. Dynamic prediction processing for environment information
8. Other examples in which acquired-in-advance environment information is used
   8.1. Action plan during conveyance working by cargo-handling automobile such as forklift
   8.2. Action plan of autonomic moving body mounted with robot arm 1. Significance of External World Information in Autonomic Movement Technology In order for a moving body such as a robot to move autonomically, it is necessary to grasp where the moving body itself is at the present time and whether an obstacle that inhibits the movement is present near the moving body or not, at all times. There are two kinds of obstacles to an autonomic moving body. One is a static obstacle that does not change with time, such as a wall of a building. The other is a mobile obstacle of which the position and attitude can change with time, such as a chair. Information regarding these obstacles is acquired by an external sensor attached to the autonomic moving body. The external sensor plays a role that is relevant in order for the autonomic moving body to arrive at the destination without hitting obstacles, while updating position and attitude information of the autonomic moving body.

However, if a constituent component or the like of a robot attached to the robot covers or obscures even only part of the surroundings of an external sensor, the external world information acquired is impaired, and the external world cannot be recognized correctly. As a result, a problem that the constituent component of the robot itself is falsely recognized as an obstacle occurs, and arrival at the destination becomes difficult. Hence, it is necessary that, even if the external sensor senses a constituent component of the robot itself, false recognition as being an obstacle be prevented. Furthermore, in a case where the constituent component is one that involves contact with an object in the external world, such as a robot arm, it is necessary to handle things, including a subject during conveyance, so as not to be treated as obstacles.

2. Overview of Robot Apparatus

A rough configuration of the whole of a robot apparatus (autonomic moving body) 1000 according to an embodiment of the present disclosure will now be described on the basis of FIG. 1. Further details are discussed below with reference to FIG. 11.

FIG. 1 is a schematic diagram showing a state where the robot apparatus 1000 according to the present embodiment is moving in the arrow direction. The robot apparatus 1000 includes an external sensor 200 that detects the state of the external world by detecting or acquiring or capturing environment information, and moves toward the destination while avoiding obstacles detected with the external sensor 200. The external sensor 200 is an object recognition sensor that recognizes or at least detects an object that is a subject or at least the presence of a subject at a distance from and/or at a direction relative to the sensor 200 (by acting as for example a distance measuring sensor configured to measure a distance to the subject), for example a sensor such as a camera, a ToF (time of flight) sensor, Light Detection and Ranging (LIDAR), a depth sensor, or an RGB (imaging) sensor, and detects environment information of the external world. The environment information may comprise for example position information of objects existing around the robot apparatus 1000. As an example, if the external sensor 200 is a camera, the environment information may comprise image information; if the external sensor 200 is a ToF sensor, the environment information is distance measurement information showing the depth positions of objects. In a case where the external sensor 200 is a camera, information of the depth positions of objects can be acquired by using a 3D camera, like in a ToF sensor.

As shown in FIG. 1, the robot apparatus 1000 includes an arm 100. The arm 100 is used to grip an object, detect the state of an object, or perform other things.

At the time when the robot apparatus 1000 moves, there is a case where the external sensor 200 senses a constituent component of the robot apparatus 1000 itself. For example, in a case where the arm 100 is included in the detection range of the external sensor 200 and the external sensor 200 has sensed the arm 100, the arm 100 is itself represented by the environment information and is therefore usually recognized as being an obstacle to the robot apparatus 1000. By the arm 100 being falsely recognized as an obstacle, the region where the arm 100 exists is judged to be a region where the risk to movement is high. In this case, the operation of the robot apparatus 1000 is determined such that the robot apparatus 1000 does not collide with the arm 100.

If the arm 100 is recognized as an obstacle and the operation of the robot apparatus 1000 is determined such that the robot apparatus 1000 does not collide with the arm 100, a restriction is imposed on the operation of the robot apparatus 1000 by the arm 100, which is originally not an obstacle. Consequently, there is a case where the operation of the robot apparatus 1000 is restricted excessively.

Thus, in the present embodiment, in a case where the external sensor 200 has sensed an element relevant to the robot apparatus 1000 itself (hereinafter, referred to as a relevant element), the external sensor 200 does not recognize the relevant element as an obstacle, and allows the operation of the robot apparatus 1000 to continue. Relevant elements in this context include constituent components included in the robot apparatus 1000 itself, such as the arm 100, grip objects that the arm 100 grips, legs, wheels, propellers, probes, tools, weapons etc. Thereby, the operation of the robot apparatus 1000 being restricted excessively can be suppressed.

Specifically, in obstacle sensing at the time when an autonomic moving body such as the robot apparatus 1000 moves, even if a relevant element relevant to the autonomic moving body is sensed, the relevant element is not recognized as an obstacle, and the movement is continued. Thereby, even in a case where the detection range of the external sensor is obstructed by a relevant element, the movement can be performed without receiving a restriction due to the relevant element.

In this event, shape approximation information (such as a bounding box) of a three-dimensional shape obtained by approximating the position and/or shape of a relevant element is generated from inside information (for example, pre-programmed information, information derived by the robot apparatus, configuration information or the like) of the robot apparatus 1000, in a space obtained or detected from environment information; thereby, shape, position, and attitude information of the relevant element is removed from the environment information, and false recognition as an obstacle is coped with. In these examples, an assessment of whether the relevant element is included in or represented by environment information (for example carried out by an assessment unit 530 to be described below) is configured to assess whether or not the relevant element is included in or represented by the environment information on the basis of: shape approximation information in which a position and a shape of the relevant element are approximated; and the environment information.

The shape approximation information may be for example information of a simple shape including the relevant element, wherein the assessment process (carried out by an assessment unit for example, as discussed below) comprises detecting, in the environment information, the presence of a shape approximation representing a simple shape including the relevant element. It may be, for example, information obtained by enlarging an outline of the relevant element, so that the shape approximation information represents a physical shape of the outline of the relevant element surrounded by a margin region.

In place of the environment information in which the relevant element is assessed to be included, an environment information setting unit can be configured to select the acquired-in-advance environment information as the environment information of a region of shape approximation information in which a position and a shape of the relevant element are approximated.

Further, the environment information of the range hidden by the relevant element is surmised by switching (or selecting in place) the environment information in which shape, position, and attitude information of the relevant element is removed, to acquired-in-advance environment information that is acquired in advance and does not include the relevant element.

Therefore in some examples an environment information setting unit is configured to select the acquired-in-advance environment information as the environment information of a region hidden by the relevant element. In some examples, wherein the environment information setting unit is configured to select the acquired-in-advance environment information as the environment information of a region where the relevant element is assessed to be included and a region hidden by the relevant element.

Furthermore, unintentional contact between the relevant element and an obstacle is suppressed by planning the action of the robot apparatus 1000 by combining the shape approximation information of three-dimensional shapes and environment information.

By the above, even in a situation where a relevant element of the robot apparatus 1000 obstructs the external sensor, the operation and movement of the robot apparatus 1000 can be continued while the environment of the external world is surmised. Further, relevant elements include not only constituent components of the robot apparatus 1000 but also subjects that the robot apparatus 1000 acts on, such as in a case where the arm 100 of the robot apparatus 1000 is holding and conveying a subject, and can therefore be used for a wide range, more than mere movement.

3. Information Replacement of Region Obstructed by Relevant Element 3.1. With Regard to Bounding Box The concept of a bounding box, which is a geometrical shape covering the whole of a subject, is used in order for the robot apparatus 1000 to grasp the position of a relevant element. The bounding box is calculated on the basis of inside information (the size, joint angle, etc. of the relevant element) that the robot apparatus 1000 possesses in its interior (or at least as a part of its configuration and/or functionality). Specifically, the bounding box is generated from shape, position, and attitude information of the relevant element calculated from the inside information.

FIG. 2 is a schematic diagram showing an example of the bounding box. FIG. 2 shows an example in which a bounding box is found for the arm 100, and shows a bounding box 30 of the arm 100 with the region of the rectangular parallelepiped shown by the broken line. As shown in FIG. 2, the bounding box 30 is a shape in which the shape of the relevant element is approximated to a simple geometrical shape, such as a rectangular parallelepiped, a cube, a circular column, a sphere, a cone, or a pyramid. On the other hand, the bounding box 30 may be the very shape of the arm 100, or may be a shape in which the shape of the arm 100 is enlarged outward by a prescribed amount. The region of the bounding box 30 is set to the same region as the region of the original arm 100 or a region larger than the region of the original arm 100.

Further, in a case where a relevant element includes a plurality of constituent components like in the arm 100 of the robot apparatus 1000, a bounding box may be generated for each constituent component.

As well as being responsive to shape information defining a shape (and size) of the bounding box or other shape approximation of the relevant element 100, the assessment of whether a relevant element is included in the environment information may also be responsive to information defining a current position of the relevant element relative to the sensor (which may be provided by an operation planning unit 570 to be discussed below).

In at least some examples, the relevant element is an element relevant to the robot apparatus (for example a constituent element or component of the robot apparatus such as the arm 100) and is movable with respect to the robot apparatus (for example by one or more actuators 582 to be discussed below) according to a current element position relative to the robot apparatus and controlled by the robot apparatus; the sensor 200 has a current sensor position relative to the robot apparatus (which current sensor position could be fixed or movable, for example by the one or more actuators 582); and the assessment of whether the relevant element is included in the environment information involves detecting the information defining a current position of the relevant element relative to the sensor in response to the current element position and the current sensor position (which information may be provided, for example, from the operation planning unit 570 to the assessment unit 530 via a data connection shown as a dotted line 572). Note that as discussed, if the current position information is not known, the position of the relevant element can be detected by shape and/or object detection in the environment information itself.

3.2. Specific Example of Bounding Box

A rectangular parallelepiped of a size in which the whole of a relevant element can be included is used as the shape of a bounding box; thereby, calculation regarding whether environment information regarding the relevant element is included in the bounding box or not can be performed easily.

On the other hand, the shape of the bounding box is not particularly limited. A bounding box of a shape most in line with reality can be generated by using a CAD model of the relevant element. On the other hand, in a case where a CAD model is used, there is a possibility that the environment information corresponding to the relevant element will deviate from the inside of the bounding box. This could be because of an error of the CAD model or an error of inside information such as the joint angle (so that the actual relevant element may occupy a region in space not predicted by the shape information). By setting the bounding box to a simple shape such as a rectangular parallelepiped and generating the bounding box in a size larger than the corresponding relevant element (such that it provides a margin region), the environment information corresponding to the relevant element can be deterred from deviating from the inside of the bounding box due to an error of inside information such as the joint angle, and robustness can be enhanced.

A bounding box in which errors of inside information can be taken into consideration while the shape remains lying along the actual shape of the relevant element may be generated by, as another method for generating a bounding box using a CAD model, enlarging a CAD model to some degree or margin. Further, a plurality of bounding boxes may be generated for one constituent component. For example, a bounding box may be formed by combining a plurality of cubes so as to cover one relevant element. In a case of the bounding box of the arm 100 shown in FIG. 2, the bounding box of the arm 100 may be generated by generating a bounding box in each of an arm main body 102 and a grip unit 104 and combining both.

3.3. Deletion of Environment Information in Bounding Box

Next, the deletion of environment information in a bounding box is described. As described above, the size and position of a bounding box can be acquired from inside information of the robot apparatus 1000. For example, if a bounding box of the arm 100 is taken as an example, the size (length, width, etc.) of the bounding box is acquired in advance when the bounding box is set for the arm 100. Further, the attitude (angle) of the bounding box is acquired from a detection value of an encoder provided in a movable unit (joint) of the arm 100. Therefore, the size and position of the bounding box can be grasped from inside information acquired by the robot apparatus 1000.

On the other hand, environment information that shows position information of objects existing around the robot apparatus 1000 is acquired by the external sensor 200. In a case where a relevant element is included in the detection range of the external sensor 200 and the external sensor 200 is capturing the relevant element, information of the relevant element is included in the environment information.

In a case where environment information is found to exist in a bounding box on the basis of the size and position of the bounding box that are grasped on the robot apparatus 1000 side, the environment information corresponds to information of the relevant element. Hence, after environment information is acquired, first, it is investigated whether environment information corresponding to a relevant element is included in a space where a bounding box exists or not.

Then, in a case where the environment information corresponding to the relevant element is included in the space of the bounding box, environment information in which the relevant element is excluded can be obtained by removing or deleting the environment information mentioned above from the inside of the space of the bounding box. In other words, once it has been assessed that the relevant element is present or included in the environment information, the environment information from the region corresponding to and/or hidden or obscured by the bounding box used to make that assessment is deleted.

FIG. 3 is a schematic diagram showing processing in a case where a relevant element is included in a bounding box. FIG. 3 shows a bounding box 30 of a rectangular parallelepiped, and shows a case where a relevant element is shown by a point group 40. If an object such as a relevant element or an obstacle is detected with the external sensor 200, the spatial shape and position of the object can be expressed as an aggregate of coordinates of the point group 40.

As an overview of this process, the points in a so-called "point cloud" represent detections in for example 3D space of something being present at the 3D position or location of that point. Where a particular object is present, the points corresponding to the detection of that object will tend to form a point group (of which the point group 40 of FIG. 3 is an example 0 roughly shaped like the detected object. The shape of the point group may be approximate (compared to the shape of the physical object being detected) because of factors such as the resolution (point to point distance) of the detection, noise, detection errors, occlusion of objects or parts of objects relative to the sensor 200 or the like.

The detection of "whether and where the relevant element is present" in the environment information can be made using various techniques. In an example technique, the physical position of the relevant element, relative to the physical position of the sensor, is derived (for example using motion controlling information by which the robot apparatus controls the movement and therefore the current location of the arm 100) and the location in the environment data is at least predicted from that information. In another example, a bounding box approximating the size and shape of the relevant element is compared with the detected point cloud at various possible positions and/or orientations, for example, limited as a set of possibilities by a predetermined or configurable range of movement of the relevant element relative to the sensor, and a position and orientation having a greatest correlation with the bounding box (for example, a highest number of points within a volume or area defined by the bounding box) is selected as an assessed location of the relevant element. The second technique does not require knowledge of the current location of the relevant element relative to the sensor. The two techniques can be combined, so that for example the correlation of the bounding box can be detected in locations at or near to the predicted location.

In some examples, once such a detection has been made, points in the point cloud corresponding to the interior of the bounding box are deleted or removed from the environment information. This will in at least some examples also include the deletion of points (if indeed they were detected) for objects or detections hidden from the sensor by the bounding box. Noting that in at least some examples the bounding box may be larger than the actual physical object, this can include the deletion of some points which may or may not correspond to the actual physical object.

The diagram on the upper side of FIG. 3 shows a state where the point group 40 is included in the bounding box 30. The point group 40 included in the bounding box 30 corresponds to environment information of a relevant element. Hence, as shown in the diagram on the lower side of FIG. 3, the environment information corresponding to the relevant element is erased by removing the point group 40 included in the bounding box 30. Thus, when recognizing an obstacle on the basis of environment information, the relevant element corresponding to the bounding box 30 is not recognized as an obstacle, and false recognition that an obstacle exists in the vicinity of the robot apparatus 1000 can be prevented.

As above, by deleting environment information in a bounding box, information of a relevant element is not included in environment information. Thus, the relevant element is not falsely recognized as an obstacle, and the robot apparatus 1000 can be controlled on the basis of environment information not including information of the relevant element.

3.4. Switching or Selecting of Environment Information

In a case where the operation, movement, etc. of the robot apparatus 1000 are controlled on the basis of environment information, environment information cannot be used for the region hidden by a relevant element. In other words, the region on the other side of a bounding box from the side of the external sensor 200 is hidden by the relevant element corresponding to the bounding box, and hence environment information cannot be acquired for this region. Therefore, in a case where there is an obstacle in the hidden region, environment information regarding the obstacle cannot be acquired.

Hence, for the region hidden by a relevant element, environment information acquired in advance (hereinafter, also referred to as acquired-in-advance environment information) is used or selected. Specifically, the environment information of the region hidden by a relevant element at a certain time point is switched to acquired-in-advance environment information acquired before that time point. Thereby, environment information can be obtained for the entire region for which environment information has been acquired by the sensor including the region hidden by the relevant element.

The acquired-in-advance environment information is environment information already acquired at a certain time point, and is basically information not including the environment information of a relevant element. Therefore, by switching the environment information of the region hidden by a relevant element to acquired-in-advance environment information, environment information not including information of the relevant element can be obtained also for the region hidden by the relevant element.

FIG. 4A and FIG. 4B are schematic diagrams showing a switching range 35 for switching to acquired-in-advance environment information. FIG. 4A is a front view showing a state where the robot apparatus 1000 is viewed from the front. Further, FIG. 4B is a plan view showing a state where the robot apparatus 1000 of FIG. 4A is viewed from above (from the direction of arrow AA1 shown in FIG. 4A). Also in the example shown in FIG. 4A and FIG. 4B, the arm 100 of the robot apparatus 1000 is taken as a relevant element, and a bounding box 30 is set for the arm 100.

As shown in FIG. 4A and FIG. 4B, the region on the opposite side of the bounding box 30 from the external sensor 200 is the region hidden by the relevant element, and is taken as a switching range 35 in which switching to acquired-in-advance environment information is performed. The switching range 35 is the range (the range marked with dots in FIG. 4A and FIG. 4B) surrounded by straight lines 40, 42, and 44 connecting the center of the external sensor 200 and apices 50, 52, and 54 of the bounding box 30, straight line 46 showing the detectable range of the external sensor 200, and straight line 48 showing the distance limit. Straight line 46 showing the detectable range of the external sensor 200 shows a range in which the external sensor 200 can detect environment information; in FIG. 4A, environment information cannot be detected in the region on the left side of straight line 46.

The switching range 35 is basically defined by the straight lines connecting the center of the external sensor 200 and apices of the bounding box 30. On the other hand, in the example shown in FIG. 4A, among the straight lines connecting the center of the external sensor 200 and the apices of the bounding box 30, straight line 47 connecting the center of the external sensor 200 and apex 56 of the bounding box 30 is located on the outside (the left side) of straight line 46 showing the detectable range of the external sensor 200. Therefore, environment information cannot be detected in the region sandwiched by straight line 47 and straight line 46. Thus, the switching range 35 is defined using straight line 46 in place of straight line 47.

By setting the switching range 35 as above, the switching range 35 is set in both the height direction shown in FIG. 4A and the horizontal direction shown in FIG. 4B in such a manner that switching is performed in the widest range and the entire region hidden by the relevant element is included.

Further, straight line 48 showing the distance limit may be provided so as to provide a limit on the switching range 35 to the extent that the subsequent action plan is not hindered. The reason why the switching range 35 is narrowed by straight line 48 showing the distance limit is that it is attempted to use environment information acquired at the present time point to the extent possible and thereby allow actions of the robot apparatus 1000 according to reality to be performed.

However, in a case where it is difficult to narrow the switching range for some reason such as a calculation load and in a case where it is not necessary to narrow the switching range, switching to environment information acquired in advance may be performed over the entire range at the time point when a relevant element is detected in a bounding box 30.

As above, for the switching range 35 hidden by a relevant element, environment information at the present time cannot be used, and hence switching to the latest acquired-in-advance environment information acquired in the past is performed. Thus, for the switching range 35, the latest, newest (most recent) acquired-in-advance environment information can be used in place of environment information at the present time. On the other hand, for the inside of the bounding box, environment information in which the relevant element is removed can be obtained by deleting information of the relevant element. Therefore, environment information with high precision in which information of the relevant element is not included can be generated.

Therefore, in such embodiments an environment information setting process (which may be carried out by an environment information setting unit 550 to be discussed below) is configured to select, in place of at least the portion of the environment information newly or most recently acquired from the sensor, a corresponding portion the most recent acquired-in-advance environment information (that is to say, the most recent of environment information acquired before the acquisition of the newly acquired environment information) for which the assessment unit assessed that the relevant element was not included in or represented by the portion of the environment information. The corresponding portion can for example be selected so as to provide the environment information of at least the portion of the newly acquired environment information, for example replacing environment information which is unavailable in the newly acquired environment information by virtue of the presence (or the assessment of the presence) of the relevant element. The acquired-in-advance environment information could have been acquired with respect to an identical sensor location (relative to the environment) but this is not necessarily a requirement, as long as the acquired-in-advance environment information which is used provides substitute environment information for the replaced environment information in eth newly acquired environment information. Note that it may be the case that a single instance of acquired-in-advance environment information does not necessarily provide all the environment information to be substituted for the at least a portion of the newly acquired environment information, in which case acquired-in-advance environment information from more than one acquisition is used. Note also that it is not a requirement that the most recent acquired-in-advance environment information is used; instead, an instance of environment information other than the most recently acquired environment information could be used. However, the use of the most recent acquired-in-advance environment information implies that the substitute information will be as up to date as possible.

The term "at least a portion" could refer to just the portion detected as representing the relevant element (noting that the detection process itself could (but does not have to)—as discussed with reference to FIGS. 2 and 3—include a margin around the relevant element. Or the term could imply that a further margin around the detected relevant element is applied at the substitution operation. Or in other examples, the term could in fact apply to the discarding of the entire newly acquired environment information and its replacement by an acquired-in-advance version.

Therefore, in examples, the "portion" could be one or more of: a region of shape approximation information in which a position and a shape of the relevant element are approximated; a region hidden by the relevant element; a region where the relevant element is assessed to be included and a region hidden by the relevant element; or the entire instance of environment data acquired by the sensor.

Optionally, the replaced "at least a portion" in the newly acquired environment information can be deleted as discussed below and the replacement environment information selected to replace it.

For example, an environment information deletion unit (to be discussed below) can be configured to delete the environment information of at least the portion of the newly acquired environment information. In some examples, the environment information setting unit is configured to select the acquired-in-advance environment information to replace the deleted environment information.

Thus, environment information not including information of the relevant element can be acquired for both the inside of the bounding box 30 and the switching range 35.

Further, switching to acquired-in-advance environment information may be performed also for the region of the bounding box 30. In this case, switching to acquired-in-advance environment information is performed for both the switching range 35 and the region of the bounding box 30. Therefore, in this case, the processing of deleting environment information in the bounding box 30 is unnecessary, and processing can be performed more simply. Further, switching to acquired-in-advance environment information may be performed for the entire region where environment information has been acquired by the external sensor 200.

Furthermore, it is also possible to perform switching to acquired-in-advance environment information only for the region of the bounding box 30. In this case, although switching to acquired-in-advance environment information is limited to a part, more accurate environment information at the present time can be acquired for the region of the bounding box 30.

On the other hand, in a case where an obstacle is included in acquired-in-advance environment information corresponding to the region of the bounding box 30, the acquired-in-advance environment information does not reflect the state at the present time; hence, the acquisition of the newest environment information showing that an obstacle does not exist in the bounding box 30 is enabled rather by removing environment information in the bounding box 30. In such a case, as described above, it is desirable that switching to acquired-in-advance environment information be performed for the switching range 35 hidden by the relevant element and environment information be deleted for the inside of the bounding box 30.

3.5. Time-Series Flow of Information Switching

FIG. 5A, FIG. 5B, and FIG. 5C are schematic diagrams showing a use example of environment information acquired at the present time and in advance, on a time-series basis. FIG. 5A, FIG. 5B, and FIG. 5C show the robot apparatus 1000 at the center of the rectangular region, and schematically show plan views in which the robot apparatus 1000 is viewed from the upper side. In addition, FIG. 5A, FIG. 5B, and FIG. 5C show relationships between the robot apparatus 1000 and regions where environment information is used.

FIG. 5A shows a situation at time t_0, and shows a situation where the external sensor 200 is covered or obscured by no relevant element. That is, a bounding box does not exist in the environment information, and information of a relevant element is not included in the environment information of the entire region detected by the external sensor 200 (the region marked with hatching in FIG. 5A). The robot apparatus 1000 makes an operation plan (as an example of the execution of a control function) on the basis of or in dependence upon environment information detected by the external sensor 200, without performing the deletion of environment information in a bounding box or switching to acquired-in-advance environment information for the switching range 35 hidden by a relevant element described above. Then, on the basis of the operation plan, the robot apparatus 1000 controls the movement of itself, the operation of the arm 100, etc. Further, the robot apparatus 1000 (for example an environment information setting unit 540 updates all the environment information detected at this time t_0, as acquired-in-advance environment information.

FIG. 5B shows a situation at time t_1 after time t_0, and shows a situation where a relevant element 300 covers or obscures part of the range of detection by the external sensor 200.

In this situation, region A1 marked with hatching in FIG. 5B is the region hidden by the relevant element 300, and environment information cannot be acquired at the time point of time t_1 for this region. Hence, the acquired-in-advance environment information acquired at time t_0 is used for region A1 hidden by the relevant element 300. In FIG. 5B, region A1 is marked with the same hatching as that of FIG. 5A, and thereby it is shown that the acquired-in-advance environment information acquired at time t_0 is used in region A1. On the other hand, the environment information of the region not obstructed by the relevant element 300 (region B1 marked with dots in the drawing) can be used as the newest environment information at time t_1; thus, environment information detected at time t_1 is used for the region not obstructed by the relevant element 300.

Further, the robot apparatus 1000 updates the environment information of region B1 not obstructed by the relevant element 300, as acquired-in-advance environment information at time t_1. In this event, the environment information of region A1 where the environment information at time t_0 (acquired-in-advance environment information) is used may be treated as the newest acquired-in-advance environment information at time t_1.

In a case where the environment information of region A1 where the environment information at time t_0 (acquired-in-advance environment information) is used is treated as the newest acquired-in-advance environment information at time t_1, the acquired-in-advance environment information at time t_0 is updated as acquired-in-advance environment information at time t_1 for region A1. Further, for region B1 not obstructed by the relevant element 300, the environment information at time t_1 is updated as acquired-in-advance environment information.

Further, FIG. 5C shows a situation at time t_2 after time t_1, and shows a situation where the relevant element 300 and a relevant element 310 cover or obscure the external sensor 200. In this situation, region A1 marked with hatching in FIG. 5C is the region hidden by the relevant element 300, and environment information cannot be acquired at the time point of time t_2 for this region. Further, region A2 marked with dots in FIG. 5C is the region hidden by the relevant element 310, and environment information cannot be acquired at the time point of time t_2 for this region.

Note that the example of FIG. 5C provides a schematic representation of a situation in which the composite environment information generated by the process incudes some newly acquired environment information and some substitute environment information from more than one instance of acquired-in-advance environment information. In each case, in this example, the most recent acquired-in-advance environment information is used for each portion.

Hence, the acquired-in-advance environment information acquired at time t_0 is used for region A1 hidden by the relevant element 300, and the acquired-in-advance environment information acquired at time t_1 is used for region A2 hidden by the relevant element 310. In FIG. 5C, region A1 is marked with the same hatching as that of FIG. 5A, and thereby it is shown that the acquired-in-advance environment information acquired at time t_0 is used in region A1. Further, region A2 is marked with the same dots as those of region B1 of FIG. 5B, and thereby it is shown that the acquired-in-advance environment information acquired at time t_1 is used in region A2. On the other hand, the environment information of the region not obstructed by the relevant element 300 or the relevant element 310 (region B2 marked with dots in the drawing) can be used as the newest environment information at time t_2; thus, environment information detected at time t_2 is used for the region not obstructed by the relevant element 300 or the relevant element 310.

Further, the robot apparatus 1000 updates the environment information (for example stored in a storage unit 560 to be discussed below) of the region not obstructed by the relevant element 300 or the relevant element 310, as acquired-in-advance environment information. In this event, similarly to FIG. 5B, the environment information of region A1 and region A2 using sensor information at time t_0 and time t_1 may be treated as the newest acquired-in-advance environment information at time t_2.

In a case where the environment information of region A1 and region A2 using sensor information at time t_0 and time t_1 is treated as the newest acquired-in-advance environment information at time t_2, the acquired-in-advance environment information at time t_0 is updated as acquired-in-advance environment information at time t_2 for region A1, and the acquired-in-advance environment information at time t_1 is updated as acquired-in-advance environment information at time t_2 for region A2. Further, for region B2 not obstructed by the relevant element 300, the environment information at time t_2 is updated as acquired-in-advance environment information.

In FIG. 5B and FIG. 5C, for the regions of the relevant elements 300 and 310, environment information is removed from the insides of the bounding boxes corresponding to the relevant elements 300 and 310, respectively. In FIG. 5B and FIG. 5C, the bounding box in which environment information is removed may be used as acquired-in-advance environment information. For example, when updating the acquired-in-advance environment information at the time point of time t_1 shown in FIG. 5B, information in which environment information is removed from the inside of the bounding box may be taken as acquired-in-advance environment information in the region of the relevant element 300. Similarly, when updating the acquired-in-advance environment information at the time point of time t_2 shown in FIG. 5C, information in which environment information is removed from the inside of the bounding box may be taken as acquired-in-advance environment information in the region of the relevant element 310.

Therefore in these examples an environment information setting unit (to be described below) is configured to sequentially update the acquired-in-advance environment information to information acquired on a time-series basis for which the relevant element does not exist in a detection range of the sensor, and the environment information setting unit is configured to select, as the environment information, the most recent acquired-in-advance environment information obtained by the updating.

4. Flow of Processing in Robot Apparatus

FIG. 6 is a flow chart showing a flow of processing in the robot apparatus 1000 of the present embodiment. In the following, processing performed in the robot apparatus 1000 is described on the basis of FIG. 6. The processing shown in FIG. 6 is classified into processing 1 and processing 2. Processing 1 is processing of removal of information regarding a relevant element in a bounding box detected by the external sensor 200 and switching to acquired-in-advance environment information acquired in advance. Further, processing 2 is processing regarding the movement of the robot apparatus 1000 and the operation of a relevant element.

By combining the above two pieces of processing, even in a case where the external sensor has detected a relevant element, false recognition of the relevant element as an obstacle is suppressed, and furthermore an action plan to avoid contact with an obstacle on the basis of position and attitude information regarding the three-dimensional shape of the relevant element can be made. Hereinbelow, a specific flow of processing is described.

The processing of FIG. 6 is performed repeatedly in each prescribed control period by a control apparatus 500 of the robot apparatus 1000. First, in step S10, an order of a task to the robot apparatus 1000 is issued by a user. As the task, various tasks such as a task of causing the robot apparatus 1000 to move toward the destination and a task of causing an object held with the arm 100 to be conveyed can be envisaged. If an order of a task is issued, the robot apparatus 1000 starts operation in accordance with the task.

In the next step S12, environment information detected by the external sensor 200 is acquired. In step S12, all environment information including relevant elements is acquired. Further, separately from the environment information detected by the external sensor, acquired-in-advance environment information that is already acquired and held in a memory or the like and does not include a relevant element is accessed. The robot apparatus 1000 saves the acquired environment information and position and attitude information of the robot apparatus 1000 while associating them together. The position and attitude information of the robot apparatus 1000 includes information regarding the positions and attitudes of bounding boxes. The processing of step S12 is constantly performed for each control period, and the environment information and the acquired-in-advance environment information are updated.

Note that at the first iteration through the present process, the first instance of "acquired in advance" environment information could be acquired. Alternatively the process could start with a first instance of "acquired in advance" environment information pre-installed at the robot, or obtained from another robot in the same locality for example by a wireless data connection, or obtained from a cloud-based or server-based data source.

In the next step S14, whether environment information corresponding to a relevant element exists in a bounding box or not is assessed; in a case where it is assessed that environment information corresponding to a relevant element exists in a bounding box, the procedure goes to step S16. In step S16, information falling under the relevant element is erased from the environment information. That is, in a case where the external sensor 200 has detected environment information in a bounding box, the environment information in the bounding box is equivalent to information of a relevant element, and hence the environment information in the bounding box is erased. Thereby, the relevant element in the bounding box being falsely recognized as an obstacle is suppressed. On the other hand, in a case where in step S14 it is assessed that environment information does not exist in a bounding box, the procedure goes to step S20 in order to make an operation plan.

Note that, as described above, the processing of step S18 may be executed without performing the processing of step S16. That is, information including information in a bounding box may be switched to acquired-in-advance environment information acquired in advance.

After step S16, the procedure goes to step S18. In step S18, environment information of the region hidden by a relevant element, which region was unable to be measured because the relevant element covered or obscured the external sensor 200, is inferred. Specifically, in step S18, switching to the acquired-in-advance environment information that was acquired in advance in step S12 in a previous control period is performed for the switching range 35 hidden by a relevant element.

In the above way, the processing of step S16 and step S18 is performed; thereby, environment information not including information of a relevant element can be obtained for both the inside of the bounding box and the switching range 35. Therefore, an operation plan of the robot apparatus 1000 can be made on the basis of environment information not including information of a relevant element.

In the processing of the next step S20 and the subsequent steps, an operation plan of the robot apparatus 1000 is made and the robot apparatus 1000 is controlled, on the basis of environment information not including information of a relevant element obtained as above. The operation plan includes a plan regarding the movement of the robot apparatus 1000 and the operation of a relevant element such as the arm 100. First, in step S20, it is assessed whether the position of an obstacle obtained from environment information not including information of a relevant element and the position of the robot apparatus 1000 are near or not. Then, in a case where it is assessed that the position of an obstacle obtained from environment information and the position of the robot apparatus 1000 are near, the procedure goes to step S22, and the distance between the obstacle and the robot apparatus 1000 is calculated. As the position of the robot apparatus 1000, the origin of the robot apparatus 1000, for example the coordinates of the center of the robot 1000 (the position of the centroid or the like), may be used. Further, as the position of the robot apparatus 1000, the position of the external sensor 200 may be used as the origin. The distance between the obstacle and the robot apparatus 1000 can be calculated by using the origin as a reference also to acquire environment information.

In the assessment of step S20, it is preferable that whether the distance between an obstacle and each bounding box is small or not be assessed using information of each bounding box that has been acquired by the robot apparatus 1000. The reference of the bounding box side at the time of measuring the distance may be the center of the bounding box or the surface, outline, etc. of the bounding box, and is not particularly limited. In a case where the distance between an obstacle and any bounding box is less than or equal to a prescribed threshold, the procedure goes to step S22, and the distance between the obstacle and the bounding box is calculated. In a case where environment information is shown by a point group as shown in FIG. 3, the distance between each point showing the obstacle and the bounding box is calculated.

Further, in a case where attachment of some meaning is performed and thereby a point group showing an obstacle can be considered to be a whole, the distance between an obstacle and any bounding box may be assessed using the center of a set that is given a meaning. For example, in a case where the size and shape of an obstacle are already known in advance, the distance between the obstacle and a bounding box can be assessed by using the center of a point group showing the obstacle and taking the size and shape of the obstacle into account. Furthermore, to suppress calculation cost, the distance may be calculated after the height direction of a point group is compressed into two dimensions. Note that the environment information is not limited to a point group.

In the next step S24, representing an example of the execution of a control function in dependence upon the environment information, a plan of the path on which the robot apparatus 1000 moves or a plan of operation of a relevant element such as the arm 100 of the robot apparatus 1000 is made on the basis of the distance between an obstacle and the robot apparatus 1000 calculated in step S22. In a case where the distance between an obstacle and the robot apparatus 1000 is calculated using the coordinates of the center of the robot apparatus 1000, in a case where the obstacle and the coordinates of the center are relatively near, the path of the robot apparatus 1000 is planned so as to go away from the obstacle. Further, in a case where the distance between an obstacle and the coordinates of the center is relatively small, the operation of a relevant element such as the arm 100 is planned so as to go away from the obstacle. Further, in a case where the distance between an obstacle and the coordinates of the center is large, the movement path of the robot apparatus 1000 and the operation of a relevant element are planned while the obstacle is not particularly taken into consideration.

Preferably, in step S24, the movement path and the operation of a relevant element are planned using information of the distance between an obstacle and a bounding box. For example, in a case where the distance between an obstacle and a bounding box is relatively small, the path of the robot apparatus 1000 is planned so as to go away from the obstacle. Further, in a case where the distance between an obstacle and a bounding box is relatively small, the operation of a relevant element such as the arm 100 is planned so as to go away from the obstacle. Thereby, an operation plan can be made with consideration of the positions and states of constituent components of the robot apparatus 1000 and relevant elements such as a grip object; thus, a safer operation plan can be made.

Further, in a case where for some reason it is not necessary to consider the distance between an obstacle and a bounding box, such as a case where the distance between an obstacle and a bounding box is large, the movement path of the robot apparatus 1000 and the operation of a relevant element may be planned without using information of the distance or information of the bounding box. After step S24, the procedure goes to step S26 or step S28.

In step S26, the robot apparatus 1000 performs traveling or stopping on the basis of the plan drafted in step S24 of the path on which the robot apparatus 1000 moves. Specifically, in step S26, the movement or stopping of the robot apparatus 1000 is performed by a mechanism such as wheels on the underside. The stopping includes also a situation where emergency stopping is performed due to some kind of external factor or internal factor.

Further, in step S28, the operation or stopping of a relevant element such as the arm 100 is performed on the basis of the plan of operation of the relevant element drafted in step S24. The stopping includes also a situation where emergency stopping is performed due to some kind of external factor or internal factor.

5. Case where Relevant Elements Include Grip Object

As described above, relevant elements widely include elements relevant to the robot apparatus 1000, such as a subject that the arm 100 grips, as well as constituent components included in the robot apparatus 1000 itself such as the arm 100. The arm 100 of the robot apparatus 1000 comes into contact with a subject and grips the subject, and performs the working of conveyance, etc. Hence, in a case where a subject is known in advance, a bounding box for the subject is prepared; in a case where the arm 100 is in contact with a subject, processing similar to the above is performed while the subject is regarded as part of the robot apparatus 1000. Thus, processing taking also a subject into consideration becomes possible.

The subject itself can be detected, for example, by detecting the width of the robot arm's jaws used to grip the object and mapping that width either to one of a set of objects having a respective width, or to one a set of bounding boxes having one dimension equal to that width. Or the sensor 200 can be associated with object recognition circuitry or software to detect an object about to be picked up. In the case of a lack of recognition then a pessimistic bounding box can be used which is as large as the largest such object which can be picked up by the robot.

FIG. 7 is a schematic diagram showing an example in which bounding boxes are obtained, including a grip object, and shows a state where the robot apparatus 1000 is viewed from the front. In the example shown in FIG. 7, the arm 100 includes a link 110, a link 120, and a grip unit 122. In addition, bounding boxes 32 and 34 corresponding to the link 110 and the link 120, respectively, are provided. Further, a bounding box 36 corresponding to the grip unit 122 at the tip of the arm 100 and a bounding box 38 corresponding to a grip object 60 that is held by the grip unit 122 are provided.

Each of a joint joining the links 110 and 120 together and a joint joining the grip unit 122 and the link 120 together is provided with an encoder that detects the rotation angle of the joint. The sizes and shapes of the bounding boxes 32, 34, and 36 are grasped in advance on the robot apparatus 1000 side, and the positions and attitudes of the bounding boxes 32, 34, and 36 are assessed on the basis of detection values of the encoders.

Further, it is assumed that the grip object 60 is gripped in a prescribed position of a grip unit 104. Therefore, the position of the grip object 60 with respect to the grip unit 104 is determined uniquely; thus, also the position and attitude of the bounding box 38 of the grip object 60 can be acquired on the robot apparatus 1000 side in advance.

Therefore, by removing environment information in the bounding box 38, the grip object 60 can be deterred from being recognized as an obstacle. Further, switching to acquired-in-advance environment information is performed for the switching range 35 that is hidden by the bounding box 38 as viewed from the external sensor 200, and thereby the robot apparatus 1000 can be controlled on the basis of environment information obtained by switching to acquired-in-advance environment information. Note that environment information in the bounding boxes 32, 34, and 36 is similarly deleted also for the link 110, the link 120, and the grip unit 122.

Examples of the grip object 60 include a PET bottle, a glass, a remote controller of a TV or the like, etc. Three-dimensional data of bounding boxes of these are acquired on the robot apparatus 1000 side in advance, and thereby the grip object 60 can be prevented from being recognized as an obstacle.

Further, even if a bounding box is not prepared in advance, a bounding box may be automatically generated by extracting a portion having some meaning from environment information and attaching a meaning to the portion of the environment information as a whole. Note that the configuration of the arm 100, the link 110, the link 120, the grip unit 122, etc. shown in FIG. 7 is only an example, and the robot apparatus 1000 is not limited to this configuration. For example, the robot apparatus 1000 may include a larger number of links, and may include a link and a grip unit in a shape and a manner different from those of FIG. 7.

6. Example in Case where Relevant Elements Overlap

FIG. 8 is a schematic diagram showing an example in which two arms 130 and 140 exist to overlap between the robot apparatus 1000 and a wall 62, and shows a state where the robot apparatus 1000 is viewed from above. As shown in FIG. 8, the arm 130 includes a link 132, a link 134, and a grip unit 136. Further, the arm 140 includes a link 142, a link 144, and a grip unit 146. Also in FIG. 8, a bounding box 72 corresponding to the link 132, a bounding box 74 corresponding to the link 134, and a bounding box 76 corresponding to the grip unit 136 are provided. Further, a bounding box 82 corresponding to the link 142, a bounding box 84 corresponding to the link 144, and a bounding box 86 corresponding to the grip unit 146 are provided.

In a case where environment information is acquired by the external sensor 200, first, environment information is removed from the insides of the bounding boxes 72, 74, and 76 of the arm 130 on the side near to the external sensor 200. Thereby, the arm 130 being recognized as an obstacle is suppressed.

Further, environment information is removed from the insides of the bounding boxes 82, 84, and 86 on the side far from the external sensor 200. In this event, when viewed from the external sensor 200 side, the bounding boxes 82, 84, and 86 are hidden by the bounding boxes 72, 74, and 76; hence, there is not much environment information corresponding to the arm 140 in the bounding box 82, 84, or 86. However, in a range not hidden by the bounding box 72, 74, or 76, environment information exists in the bounding boxes 82, 84, and 86; thus, environment information of these bounding boxes is removed.

Thereby, environment information corresponding to the arms 130 and 140 is removed. Then, switching to acquired-in-advance environment information is performed for the switching range 35 hidden by both the arm 130 and the arm 140. Therefore, in the state shown in FIG. 8, environment information corresponding to the arms 130 and 140 is removed, and the robot apparatus 1000 recognizes only the wall 62 included in the acquired-in-advance environment information as an obstacle. Thus, the robot apparatus 1000 is in a state where it can see through behind the arms 130 and 140, and can make an operation plan while taking only the wall 62 into consideration as an obstacle.

As above, even if a relevant element that cannot be detected by the external sensor 200 exists due to overlapping of relevant elements, each bounding box is generated from inside data of the robot apparatus 1000, and environment information is deleted from each bounding box. Further, information acquired in advance is used as information of an obstacle. Therefore, like in FIG. 7, environment information in which a relevant element is excluded can be obtained, and the robot apparatus 1000 can be controlled on the basis of the environment information.

7. Dynamic Prediction Processing for Environment Information

Ina case where a mobile obstacle exists, there is a possibility that, when using acquired-in-advance environment information acquired in advance, the mobile obstacle will have moved from the position at the last time acquired in advance. Hence, the movement track of the mobile obstacle is predicted from the amount of change in the position of the mobile obstacle in acquired-in-advance environment information, and a movement plan and an operation plan may be made with consideration of the movement of the mobile obstacle.

FIG. 9A to FIG. 9D are schematic diagrams showing an example of the processing of predicting a movement locus for a mobile obstacle, and show states where the robot apparatus 1000 is viewed from above. FIG. 9A to FIG. 9D are plan views showing positional relationships between the robot apparatus 1000 and a mobile obstacle 70 at time t_10, time t_11, time t_12, and time t_13, respectively, on a time-series basis. As shown in FIG. 9A and FIG. 9B, the mobile obstacle 70 is moving upward on the drawing. That is, at time t_11 after time t_10, the mobile obstacle 70 is moving more on the upper side than the mobile obstacle 70 at time t_10.

As shown in FIG. 9C, it is assumed that a relevant element 320 covers or obscures part of the detection range of the external sensor 200 at time t_12 after time t_11. In this case, acquired-in-advance environment information is used in an operation plan of the robot apparatus 1000, and the path of the robot apparatus 1000 is planned by using information at both time t_10 and time t_11 to grasp the fact that the mobile obstacle 70 has moved and predict the subsequent movement locus of the mobile obstacle 70.

Specifically, at the time point of time t_12 shown in FIG. 9C, basically the newest acquired-in-advance environment information at time t_11 is used for the switching range hidden by the relevant element 320. On the other hand, in a case where acquired-in-advance environment information at time t_11 is used, the motion of the mobile moving body 70 from time t_11 to time t_12 is not reflected in the acquired-in-advance environment information. Hence, the motion of the mobile moving body 70 from time t_11 to time t_12 is predicted by using environment information at both time t_10 and time t_11, and the predicted position of the mobile moving body 70 at the time point of time t_12 (shown by the broken line in FIG. 9C) is caused to be reflected in the acquired-in-advance environment information at time t_11.

Thereby, as shown in FIG. 9C, a movement plan 78 of the robot apparatus 1000 can be drafted on the basis of the acquired-in-advance environment information at time t_11 and the predicted position of the mobile moving body 70 at the time point of time t_12.

FIG. 9D shows a state where, at time t_13, the robot apparatus 1000 is moving on the basis of the movement plan 78 of the mobile moving body 70 made at time t_12. Although FIG. 9A to FIG. 9D describe an example in which a path not in contact with the mobile obstacle 70 is generated from the prediction of the movement track for the mobile obstacle 70, a judgment of causing the robot apparatus 1000 to stop may be made at the time point when the existence of the mobile obstacle 70 is recognized.

As above, in a case where switching to acquired-in-advance environment information is performed, the situation in the future is predicted on the basis of transition in the past accumulated in advance; thereby, an operation plan can be made in accordance with advance environment information in which the future is predicted and the situation of the robot apparatus 1000 at the present time.

8. Other Examples in which Acquired-in-Advance Environment Information is Used 8.1. Action Plan During Conveyance Working by Cargo-Handling Automobile Such as Forklift As described above, in the present embodiment, even in a case where a relevant element has obstructed the external sensor 200, the situation of the external world is inferred by using acquired-in-advance environment information, and can be used for an operation plan. In the following, a specific example in a case of being applied to a cargo-handling automobile such as a forklift is described.

In a case where a cargo is conveyed with a cargo-handling automobile such as a forklift, there is a possibility that a situation will occur where information of the cargo and a relevant element used to raise and lower the cargo is included in environment information and environment information is not obtained sufficiently. Hence, it is envisaged that, in a case where the cargo is lowered, the situation of a desk or a floor that is the destination onto which the cargo is lowered cannot be grasped adequately and this will lead to the occurrence of an unexpected accident, etc.

FIG. 10 is a schematic diagram showing an example of unloading by a forklift 1010. The forklift 1010 is an example of the robot apparatus 1000. FIG. 10 shows a situation where the forklift 1010 moves in the direction of arrow AA2 from the left side and the forklift 1010 lowers a cargo 80 it is conveying on a platform 82 if the forklift 1010 arrives at the front of the platform 82.

During conveyance, the cargo 80 conveyed by the forklift 1010 is lifted by arms 400 at the position shown by the alternate long and two short dashes line. In a state where the cargo 80 is thus lifted, relevant elements of the forklift 1010, such as the cargo 80, the arms 400, and a movement mechanism 402 that causes the arms 400 to move up and down, are included in the detection range of the external sensor 200. Then, information of the surroundings of the platform 82 is hidden by these relevant elements.

Therefore, if it is attempted to lower the cargo 80 onto the platform 82 in the state shown in FIG. 10 without using acquired-in-advance environment information, information of the vicinity of the platform 82 is not included in environment information obtained from the external sensor 200; hence, a situation occurs where the positional relationship in the horizontal direction between the forklift 1010 and the platform 82, the amount of vertical movement for causing the cargo 80 to lower, etc. cannot be grasped accurately.

Hence, before the forklift 1010 comes close to the platform 82, environment information of the platform 82 is acquired, and is held as acquired-in-advance environment information. In a state before the forklift 1010 comes close to the platform 82, the surroundings of the platform 82 are included in the detection range of the external sensor. Thus, environment information acquired before the forklift 1010 comes close to the platform 82 is used as acquired-in-advance environment information.

Thereby, the positional relationship in the horizontal direction between the forklift 1010 and the platform 82 can be grasped when the forklift 1010 moves and comes close to the platform 82, and therefore the forklift 1010 can be caused to stop at the optimum position shown in FIG. 10. Further, the amount of vertical movement for causing the cargo 80 to lower can be grasped on the basis of acquired-in-advance environment information, and therefore the cargo 80 can be mounted on the platform 82 accurately by causing the cargo 80 to lower on the basis of the grasped amount of vertical movement. As above, the environment state of the neighborhood of the destination onto which the cargo 80 is lowered can be inferred by using acquired-in-advance environment information acquired before the forklift 1010 lowers the cargo 80, and stable conveyance working can be performed.

As above, even in a situation where the platform 82 and its surroundings are hidden inevitably during the task, the situation of the platform 82 and its surroundings is acquired as acquired-in-advance environment information when the robot apparatus 1000 is apart from the platform 82, and thereby desired operation can be performed in a case where the robot apparatus 1000 comes close to the platform 82.

8.2. Action Plan of Autonomic Moving Body Mounted with Robot Arm

The robot apparatus 1000 including the arm 100 can be used not only for the use of conveyance but also for the purpose of performing communication with a person or a machine by a gesture such as waving a hand. In a case where the robot apparatus 1000 approaches a person or a subject while waving a hand (the arm 100), a situation where the external sensor 200 constantly continues to detect the arm 100 can occur; however, according to the present embodiment, the robot apparatus 1000 can approach a person or a subject safely while inferring environment information hidden by the arm 100.

The object of application of an embodiment of the present disclosure ranges widely, and does not depend on the movement manner of the autonomic moving body or the shape or role of the relevant element. Hence, the movement manner of the robot apparatus 1000 may be not only rotation mechanisms such as wheels or crawlers but also legged mechanisms or winged mechanisms including rotor blades, such as drones. Further, a configuration in which a relevant element such as the arm 100 operates without the robot apparatus 1000 moving is possible.

9. Configuration Example of Control Apparatus

FIG. 11 is a block diagram showing the configuration of the control apparatus 500 that controls the robot apparatus 1000, the robot apparatus also including (as drawn) the sensor 200 which provides environment information to the control apparatus 500 and one or more movement actuators 582 controlled by the control apparatus 500 and configured to move the robot apparatus on the basis of the operation plan. The control apparatus 500 is basically provided in the interior of (or at least as a part of the functionality of) the robot apparatus 1000, but may be provided outside the robot apparatus 1000, and may be one that is provided on a cloud and performs communication with the robot apparatus 1000, for example. As shown in FIG. 11, the control apparatus 500 includes a bounding box information holding unit 510, a position and attitude information acquisition unit 520, an assessment unit 530, an environment information setting unit 540 (for example, configured to sequentially update the acquired-in-advance environment information on a time-series basis), an environment information storage unit 560, an environment information deletion unit 550, an operation planning unit 570, and an operation control unit 580. Note that each of the constituent elements shown in FIG. 11 includes a circuit (hardware), or a central arithmetic processing device such as a CPU and a program (software) for causing this device to work.

The bounding box information holding unit 510 holds information of bounding boxes of relevant elements, such as bounding boxes of constituent components of the robot apparatus 1000 such as the arm 100 and a bounding box of the grip object 60. The position and attitude information acquisition unit 520 acquires the angle of a joint of the arm 100 or the like from an encoder or the like provided in the joint, for example, and thereby acquires information of the position and attitude of each bounding box.

The assessment unit 530 assesses whether a relevant element is included in environment information acquired from the external sensor 200 or not. More specifically, the assessment unit 530 acquires three-dimensional information regarding the shapes and sizes of bounding boxes from the bounding box information holding unit 510, and acquires information of the positions and attitudes of bounding boxes from the position and attitude information acquisition unit 520. Then, the assessment unit 530 assesses whether a relevant element is included in environment information or not in accordance with whether environment information is included in a bounding box or not. In a case where environment information is included in a bounding box, the assessment unit 530 assesses that a relevant element is included in environment information; in a case where environment information is not included in a bounding box, the assessment unit 530 assesses that a relevant element is not included in environment information.

In a case where the assessment unit 530 has assessed that a relevant element is included in environment information acquired from the external sensor 200, the environment information setting unit 540 switches the environment information to acquired-in-advance environment information in which the relevant element is not included. The environment information storage unit 560 is a constituent element that stores acquired-in-advance environment information, and updates and stores acquired-in-advance environment information for each control period (or at least the environment information other than a portion assessed as including the relevant element). The environment information setting unit 540 performs switching to advance environment information stored in the environment information storage unit 560. Furthermore, in a case where a mobile obstacle is included in or represented by acquired-in-advance environment information, the environment information setting unit 540 predicts the motion of the mobile obstacle by the technique shown in FIG. 9A to FIG. 9D, and causes the predicted motion to be reflected in acquired-in-advance environment information.

In a case where environment information is included in a bounding box, the environment information deletion unit 550 performs the processing of deleting the environment information in the bounding box. The environment information setting unit 540 uses information of the bounding box in which the environment information is deleted, as environment information.

The operation planning unit 570 makes an operation plan of the robot apparatus 1000 (as an example of executing a control function) in dependence upon or on the basis of environment information (formed, for example, of the environment information newly detected by the external sensor 200 and the acquired-in-advance environment information). The operation planning unit 570 calculates the distance to an obstacle on the basis of environment information detected by the external sensor 200 and acquired-in-advance environment information, and makes or generates an operation plan on the basis of the distance to the obstacle. The operation control unit 580 controls the operation of the robot apparatus 1000 on the basis of the operation plan of the operation planning unit 570. The operation of the robot apparatus 1000 includes, as well as the operation of movement mechanisms such as wheels and legs that cause the robot apparatus 1000 itself to move (for example by the operation control unit 580 controlling one or more movement actuators 582 such as one or more motors to move the robot apparatus, so that the operation control unit is configured to control operation of the one or more movement actuators 582 on the basis of the operation plan, which may include an operation to move the whole robot and/or an operation that moves relevant elements such as the arm 100. The operation planning unit 570 makes a plan of operation of the robot apparatus 1000 using, as an example, a planner, machine learning, spline interpolation, or a Bezier curve.

The operation planning unit can also be configured to calculate a distance between shape approximation information in which a position and a shape of the relevant element are approximated and an obstacle on a basis of the environment information acquired from the sensor and the acquired-in-advance environment information, and to generate the operation plan on a basis of the distance Note that the one or more movement actuators can be movement actuators to control a bulk movement such as a translation or rotation of the robot, and/or movement actuators to control movement of a part or component of the robot such as the arm 100 relative to the rest of the robot apparatus.

The one or more actuators 582 could drive, for example, wheels 584 and/or the relevant element 100.

FIG. 11 therefore provides an example of a control apparatus 500 comprising: an assessment unit 530 configured to assess whether or not a relevant element is included in environment information newly acquired from a sensor; an environment information setting unit 540 configured, in a case where the assessment unit has assessed that the relevant element is included in a portion of the environment information, to select, in place of at least the portion of the environment information newly acquired from the sensor, acquired-in-advance environment information in which the relevant element is assessed not to be included; and a control unit 570, 580 configured to execute a control function (such as the control of the one or more movement actuators 582 and/or the generation of an operation plan to provide such control) in dependence upon the environment information.

The arrangement of FIG. 11, for example when embodied in a physical form such as that shown in FIG. 1, provides an example of robot apparatus 1000 comprising: control apparatus 500; and a sensor 200 configured to provide environment information; wherein the sensor is an object recognition sensor configured to recognize a subject.

FIG. 12 is a schematic flowchart illustrating a control method comprising: assessing (at a step 1200) whether or not a relevant element is included in environment information newly acquired from a sensor; in a case where the assessing step assesses that the relevant element is included in a portion of the environment information, selecting (at a step 1210) (or switching to), in place of at least the portion of the environment information newly acquired from the environment sensor, acquired-in-advance environment information in which the relevant element is not assessed to be included; and executing (at a step 1220) a control function in dependence upon the environment information.

As mentioned, the process or method of FIG. 12 can be carried out by a suitable computer or data processing apparatus which is caused to perform the method by executing appropriate computer software, in which case such software, and/or a machine readable non-transitory storage medium which stores such software, are to be treated as embodiments of the present disclosure.

FIG. 13 is a schematic diagram illustrating such a computer or data processing apparatus 1300, comprising a central processing unit (CPU) 1310, a read only memory (ROM) 1320 for example acting as an example of a machine readable non-transitory storage medium which stores such software for execution by the CPU 1310, a random access memory 1330 and an input/output (I/O) interface, for example to interface with the sensor 200 and/or the actuators 582, all interconnected by a schematic bus structure 1350. For example, the apparatus 1300 could implement (under software control) functions of FIG. 11 except for those of the sensor 200 and the actuator(s) 582 and associated mechanics.

As described hereinabove, according to the present embodiment, a bounding box corresponding to a relevant element is generated, and environment information in the bounding box is removed. Further, environment information of the region of a relevant element or the region hidden by a relevant element is switched to acquired-in-advance environment information. Thereby, the relevant element being recognized as an obstacle on the basis of environment information is suppressed, and the movement and operation of the robot apparatus 1000 can be controlled optimally.

It should be understood by those skilled in the art that various modifications, combinations, sub-combinations and alterations may occur depending on design requirements and other factors insofar as they are within the scope of the appended claims or the equivalents thereof.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as set out below in the following numbered paragraphs:

(1) A control apparatus including:
an assessment unit configured to assess whether a relevant element is included in environment information acquired from a sensor or not; and
an environment information setting unit configured to, in a case where the assessment unit has assessed that the relevant element is included in the environment information, switch the environment information to acquired-in-advance environment information in which the relevant element is not included.

(2) The control apparatus according to (1),
in which the assessment unit assesses whether the relevant element is included in the environment information or not on a basis of shape approximation information in which a position and a shape of the relevant element are approximated and the environment information.

(3) The control apparatus according to (2),
in which, in a case where the environment information is included in a space shown by the shape approximation information, the assessment unit assesses that the relevant element is included in the environment information.

(4) The control apparatus according to (2) or (3),
in which the shape approximation information is information of a simple shape including the relevant element.

(5) The control apparatus according to any of (2) to (4),
in which the shape approximation information is information obtained by enlarging an outline of the relevant element.

(6) The control apparatus according to any of (1) to (5),
in which the environment information setting unit switches the environment information to the newest acquired-in-advance environment information acquired in advance in a state where the relevant element does not exist in a detection range of the sensor, and sets new environment information in which the relevant element does not exist in a target range of the switching.

(7) The control apparatus according to any of (1) to (5),
in which the acquired-in-advance environment information is sequentially updated to information acquired on a time-series basis in a state where the relevant element does not exist in a detection range of the sensor, and
the environment information setting unit switches the environment information to the newest acquired-in-advance environment information obtained by the updating.

(8) The control apparatus according to any of (1) to (7),
in which the environment information setting unit switches the environment information of a region where the relevant element exists, to the acquired-in-advance environment information.

(9) The control apparatus according to (8),
in which the environment information setting unit switches the environment information of a region of shape approximation information in which a position and a shape of the relevant element are approximated, to the acquired-in-advance environment information.

(10) The control apparatus according to any of (1) to (9),
in which the environment information setting unit switches the environment information of a region hidden by the relevant element, to the acquired-in-advance environment information.

(11) The control apparatus according to any of (1) to (9),
in which the environment information setting unit switches the environment information of a region where the relevant element exists and a region hidden by the relevant element, to the acquired-in-advance environment information.

(12) The control apparatus according to any of (1) to (11),
in which the environment information setting unit switches the environment information of an entire region, to the acquired-in-advance environment information.

(13) The control apparatus according to (11), including:
an environment information deletion unit configured to delete the environment information of a region where the relevant element exists.

(14) The control apparatus according to (13),
in which the environment information setting unit deletes the environment information in a space of shape approximation information in which a position and a shape of the relevant element are approximated.

(15) The control apparatus according to (13),
in which the environment information setting unit performs switching to the acquired-in-advance environment information obtained by deleting the environment information in past.

(16) The control apparatus according to any of (1) to (15),
in which the sensor is an object recognition sensor configured to recognize a subject.

(17) The control apparatus according to (16),
in which the sensor is a distance measuring sensor configured to measure a distance to the subject.

(18) The control apparatus according to any of (1) to (17), including:
an operation planning unit configured to make an operation plan on a basis of the environment information acquired from the sensor and the acquired-in-advance environment information.

(19) The control apparatus according to (18),
in which the operation planning unit calculates a distance to an obstacle on a basis of the environment information acquired from the sensor and the acquired-in-advance environment information, and makes the operation plan on a basis of the distance to the obstacle.
(20) The control apparatus according to (18),
in which the operation planning unit calculates a distance between shape approximation information in which a position and a shape of the relevant element are approximated and an obstacle on a basis of the environment information acquired from the sensor and the acquired-in-advance environment information, and makes the operation plan on a basis of the distance.
(21) The control apparatus according to (18), including:
a control unit configured to control operation of a robot on a basis of the operation plan.
(22) The control apparatus according to any of (1) to (21),
in which, in a case where a mobile obstacle is included in the acquired-in-advance environment information, the environment information setting unit predicts motion of the mobile obstacle and causes the predicted motion to be reflected in the acquired-in-advance environment information.
(23) The control apparatus according to any of (1) to (22),
in which the control apparatus controls a robot, and the relevant element is an element relevant to the robot.
(24) The control apparatus according to (23),
in which the relevant element is a constituent component included in the robot or a subject that the robot acts on.
(25) A control method including:
assessing whether a relevant element is included in environment information acquired from a sensor or not; and
in a case where it is assessed that the relevant element is included in the environment information, switching the environment information to acquired-in-advance environment information in which the relevant element is not included.
(26) A program for causing a computer to function as:
a device configured to assess whether a relevant element is included in environment information acquired from a sensor or not; and
a device configured to, in a case where it is assessed that the relevant element is included in the environment information, switch the environment information to acquired-in-advance environment information in which the relevant element is not included.

Further example arrangements are defined by the following numbered clauses:
1. A control apparatus comprising:
an assessment unit configured to assess whether or not a relevant element is represented by environment information newly acquired from a sensor;
an environment information setting unit configured, in a case where the assessment unit has assessed that the relevant element is represented by a portion of the environment information, to select, in place of at least the portion of the environment information newly acquired from the sensor, acquired-in-advance environment information in which the relevant element is assessed not to be included; and
a control unit configured to execute a control function in dependence upon the environment information.

2. The control apparatus according to clause 1,
wherein the assessment unit is configured to assess whether or not the relevant element is represented by the environment information on the basis of: shape approximation information in which a position and a shape of the relevant element are approximated; and the environment information.
3. The control apparatus according to clause 2,
wherein the assessment unit is responsive to information defining a current position of the relevant element relative to the sensor; and
wherein, in a case where the environment information is represented by a space defined by the shape approximation information at a position dependent upon the information defining the current position of the relevant element relative to the sensor, the assessment unit is configured to assess that the relevant element is represented by the environment information.
4. The control apparatus according to clause 2,
wherein the assessment unit is configured to detect, in the environment information, the presence of a shape approximation representing a simple shape including the relevant element 5. The control apparatus according to clause 2,
wherein the shape approximation information represents a physical shape of the outline of the relevant element surrounded by a margin region.
6. The control apparatus according to clause 1,
wherein the environment information setting unit is configured to select, in place of at least the portion of the environment information newly acquired from the sensor, the most recent acquired-in-advance environment information for which the assessment unit assessed that the relevant element was not represented by the portion of the environment information.
7. The control apparatus according to clause 1,
wherein the environment information setting unit is configured to sequentially update the acquired-in-advance environment information to information acquired on a time-series basis for which the relevant element does not exist in a detection range of the sensor, and
the environment information setting unit is configured to select, as the environment information, the most recent acquired-in-advance environment information obtained by the updating.
8. The control apparatus according to clause 1,
wherein the portion of the environment information is a region of shape approximation information in which a position and a shape of the relevant element are approximated.
9. The control apparatus according to clause 1,
wherein the portion of the environment information is a region hidden by the relevant element.
10. The control apparatus according to clause 1,
wherein the portion of the environment information is a region where the relevant element is assessed to be included and a region hidden by the relevant element.
11. The control apparatus according to clause 1,
wherein the portion of the environment information is an entire region for which environment information has been acquired by the sensor. 12. The control apparatus according to clause 10, comprising:

an environment information deletion unit configured to delete the environment information of at least the portion of the newly acquired environment information.

13. The control apparatus according to clause 12,
wherein the environment information setting unit is configured to select the acquired-in-advance environment information to replace the deleted environment information.

14. Robot apparatus comprising:
control apparatus according to clause 1; and
a sensor configured to provide environment information;
wherein the sensor is an object recognition sensor configured to recognize a subject.

15. Robot apparatus according to clause 14,
wherein the sensor is a distance measuring sensor configured to measure a distance to the subject.

16. Robot apparatus according to clause 14, comprising:
an operation planning unit configured to generate an operation plan for the robot apparatus on as the control function in dependence upon the environment information.

17. Robot apparatus according to clause 16,
wherein the operation planning unit is configured to calculate a distance to an obstacle on a basis of the environment information acquired from the sensor and the acquired-in-advance environment information, and to generate the operation plan on a basis of the distance to the obstacle.

18. Robot apparatus according to clause 16,
wherein the assessment unit is responsive to information defining a current position of the relevant element relative to the sensor; and
wherein the operation planning unit is configured to calculate a distance between shape approximation information in which a position and a shape of the relevant element are approximated and an obstacle on a basis of the environment information acquired from the sensor and the acquired-in-advance environment information, and to generate the operation plan on a basis of the distance.

19. Robot apparatus according to clause 16, comprising:
one or more movement actuators to move the robot apparatus;
the control unit configured to control operation of the one or more movement actuators to move the robot apparatus on the basis of the operation plan.

20. Robot apparatus according to clause 14,
wherein, in a case where a mobile obstacle is represented by the acquired-in-advance environment information, the environment information setting unit is configured to predict motion of the mobile obstacle and to cause the predicted motion to be reflected in the acquired-in-advance environment information.

21. Robot apparatus according to clause 14,
wherein:
the relevant element is an element relevant to the robot apparatus and movable with respect to the robot apparatus according to a current element position relative to the robot apparatus and controlled by the robot apparatus;
the sensor has a current sensor position relative to the robot apparatus; and
the assessment unit is configured to detect the information defining a current position of the relevant element relative to the sensor in response to the current element position and the current sensor position.

22. Robot apparatus according to clause 21,
wherein the relevant element is a constituent component of the robot apparatus.

23. A control method comprising:
assessing whether or not a relevant element is represented by environment information newly acquired from a sensor;
in a case where the assessing step assesses that the relevant element is represented by a portion of the environment information, selecting, in place of at least the portion of the environment information newly acquired from the environment sensor, acquired-in-advance environment information in which the relevant element is not assessed to be included; and
executing a control function in dependence upon the environment information.

24. Computer software which, when executed by a computer, causes the computer to perform the method of clause 23.

25 A non-transitory machine-readable medium which stores computer software according to clause 24.

REFERENCE SIGNS LIST

500 control apparatus
530 assessment unit
540 environment information setting unit
570 operation planning unit
580 operation control unit

The invention claimed is:
1. A control apparatus comprising:
an assessment unit configured to assess whether or not a relevant element is represented by environment information newly acquired from a sensor at a current time;
an update unit configured to update the environment information not obstructed by the relevant element and in which the relevant element is assessed not to be included, as newest acquired-in-advance environment information, the newest acquired-in-advance environment information being acquired from the sensor at a time prior to the current time;
an environment information setting unit configured, in a case where the assessment unit has assessed that the relevant element is represented by the environment information newly acquired from the sensor, to switch a portion of the environment information newly acquired from the sensor to the newest acquired-in-advance environment information; and
a control unit configured to execute a control function in dependence upon the environment information,
wherein the assessment unit, the update unit, the environment information setting unit, and the control unit are each implemented via at least one processor.

2. The control apparatus according to claim 1,
wherein the assessment unit is further configured to assess whether or not the relevant element is represented by the environment information newly acquired from the sensor at the current time on a basis of: shape approximation information in which a position and a shape of the relevant element are approximated; and the environment information.

3. The control apparatus according to claim 2,
wherein the assessment unit is responsive to information defining a current position of the relevant element relative to the sensor, and
wherein, in a case where the environment information is represented by a space defined by the shape approximation information at a position dependent upon the information defining the current position of the relevant element relative to the sensor, the assessment unit is further configured to assess that the relevant element is represented by the environment information.

4. The control apparatus according to claim 2,
wherein the assessment unit is further configured to detect, in the environment information, a presence of a shape approximation representing a simple shape including the relevant element.

5. The control apparatus according to claim 2,
wherein the shape approximation information represents a physical shape of an outline of the relevant element surrounded by a margin region.

6. The control apparatus according to claim 1,
wherein the environment information setting unit is further configured to select, in place of at least the portion of the environment information newly acquired from the sensor, most recent acquired-in-advance environment information for which the assessment unit assessed that the relevant element was not represented by the portion of the environment information.

7. The control apparatus according to claim 1,
wherein the environment information setting unit is further configured to sequentially update the acquired-in-advance environment information to information acquired on a time-series basis for which the relevant element does not exist in a detection range of the sensor, and
wherein the environment information setting unit is further configured to select, as the environment information, most recent acquired-in-advance environment information obtained by the updating.

8. The control apparatus according to claim 1,
wherein the portion of the environment information is a region of shape approximation information in which a position and a shape of the relevant element are approximated.

9. The control apparatus according to claim 1,
wherein the portion of the environment information is a region hidden by the relevant element.

10. The control apparatus according to claim 1,
wherein the portion of the environment information is a region where the relevant element is assessed to be included and a region hidden by the relevant element.

11. The control apparatus according to claim 10, further comprising:
an environment information deletion unit configured to delete the environment information of at least the portion of the environment information newly acquired from the sensor,
wherein the environment information deletion unit is implemented via at least one processor.

12. The control apparatus according to claim 11,
wherein the environment information setting unit is further configured to select the acquired-in-advance environment information to replace the deleted environment information.

13. The control apparatus according to claim 1,
wherein the portion of the environment information is an entire region for which environment information has been acquired by the sensor.

14. A robot apparatus comprising:
the control apparatus according to claim 1; and
the sensor configured to provide environment information,
wherein the sensor is an object recognition sensor configured to recognize a subject.

15. The robot apparatus according to claim 14,
wherein the sensor is a distance measuring sensor configured to measure a distance to the subject.

16. The robot apparatus according to claim 14, further comprising:
an operation planning unit configured to generate an operation plan for the robot apparatus on as the control function in dependence upon the environment information,
wherein the operation planning unit is implemented via at least one processor.

17. The robot apparatus according to claim 16,
wherein the operation planning unit is further configured to
calculate a distance to an obstacle on a basis of the environment information acquired from the sensor and the acquired-in-advance environment information, and
generate the operation plan on a basis of the distance to the obstacle.

18. The robot apparatus according to claim 16,
wherein the assessment unit is responsive to information defining a current position of the relevant element relative to the sensor, and
wherein the operation planning unit is further configured to
calculate a distance between shape approximation information in which a position and a shape of the relevant element are approximated and an obstacle on a basis of the environment information acquired from the sensor and the acquired-in-advance environment information, and
generate the operation plan on a basis of the distance.

19. The robot apparatus according to claim 16, further comprising:
one or more movement actuators to move the robot apparatus,
wherein the control unit is further configured to control operation of the one or more movement actuators to move the robot apparatus on a basis of the operation plan.

20. The robot apparatus according to claim 14,
wherein, in a case where a mobile obstacle is represented by the acquired-in-advance environment information, the environment information setting unit is further configured to
predict motion of the mobile obstacle, and
cause the predicted motion to be reflected in the acquired-in-advance environment information.

21. The robot apparatus according to claim 14,
wherein the relevant element is an element relevant to the robot apparatus and movable with respect to the robot apparatus according to a current element position relative to the robot apparatus and controlled by the robot apparatus,
wherein the sensor has a current sensor position relative to the robot apparatus, and wherein the assessment unit is further configured to detect the information defining a current position of the relevant element relative to the sensor in response to the current element position and the current sensor position.

22. The robot apparatus according to claim 21, wherein the relevant element is a constituent component of the robot apparatus.

23. The control apparatus according to claim 1, wherein the environment information setting unit is further configured, in the case where the assessment unit has assessed that the relevant element is represented by the environment information, to switch the portion of the environment information newly acquired from the sensor corresponding to a region obscured by the relevant element to the newest acquired-in-advance environment information corresponding to the region obscured by the relevant element.

24. The robot apparatus according to claim 1, wherein, in a case where a mobile obstacle is represented by the acquired-in-advance environment information, the environment information setting unit is further configured to predict motion of the mobile obstacle, and cause the predicted motion to be reflected in the acquired-in-advance environment information.

25. A control method comprising:

assessing whether or not a relevant element is represented by environment information newly acquired from a sensor at a current time;

updating the environment information not obstructed by the relevant element and in which the relevant element is assessed not to be included, as newest acquired-in-advance environment information, the newest acquired-in-advance environment information being acquired from the sensor at a time prior to the current time;

switching, in a case where the assessing assesses that the relevant element is represented by the environment information newly acquired from the sensor, a portion of the environment information newly acquired from the sensor to the newest acquired-in-advance environment information; and executing a control function in dependence upon the environment information.

26. A non-transitory computer-readable medium having embodied thereon a program, which when executed by a computer, causes the computer to execute a control method, the method comprising:

assessing whether or not a relevant element is represented by environment information newly acquired from a sensor at a current time;

updating the environment information not obstructed by the relevant element and in which the relevant element is assessed not to be included, as newest acquired-in-advance environment information, the newest acquired-in-advance environment information being acquired from the sensor at a time prior to the current time;

switching, in a case where the assessing assesses that the relevant element is represented by the environment information newly acquired from the sensor, a portion of the environment information newly acquired from the sensor to the newest acquired-in-advance environment information; and executing a control function in dependence upon the environment information.

* * * * *